(12) United States Patent
Saito et al.

(10) Patent No.: US 12,028,603 B2
(45) Date of Patent: Jul. 2, 2024

(54) IMAGE PROCESSING SYSTEM, IMAGE PROCESSING METHOD, STORAGE MEDIUM, IMAGE PICKUP APPARATUS, AND OPTICAL UNIT

(71) Applicant: CANON KABUSHIKI KAISHA, Tokyo (JP)

(72) Inventors: Tadanori Saito, Tokyo (JP); Ryo Fueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/951,487

(22) Filed: Sep. 23, 2022

(65) Prior Publication Data

US 2023/0094232 A1    Mar. 30, 2023

(30) Foreign Application Priority Data

Sep. 24, 2021   (JP) ................................ 2021-155589
Sep. 20, 2022   (JP) ................................ 2022-148737

(51) Int. Cl.
  *H04N 23/63*   (2023.01)
(52) U.S. Cl.
  CPC ................................ *H04N 23/635* (2023.01)
(58) Field of Classification Search
  CPC .......................... H04N 23/635; H04N 23/698
  See application file for complete search history.

(56) References Cited

U.S. PATENT DOCUMENTS

| 10,917,610 | B2 | 2/2021 | Aihara |
| 11,310,461 | B2 | 4/2022 | Aihara |

| 2002/0057279 | A1* | 5/2002 | Jouppi | H04N 7/142 |
| | | | | 348/E7.079 |
| 2012/0050487 | A1* | 3/2012 | Masumura | G01M 11/0221 |
| | | | | 348/46 |
| 2015/0109446 | A1 | 4/2015 | Takano | |

(Continued)

FOREIGN PATENT DOCUMENTS

| JP | 2004-272706 A | 9/2004 |
| JP | 2004-345554 A | 12/2004 |

(Continued)

OTHER PUBLICATIONS

Sep. 5, 2023 Japanese Official Action in Japanese Patent Appln. No. 2022-148737.

*Primary Examiner* — Yogesh K Aggarwal
(74) *Attorney, Agent, or Firm* — Venable LLP

(57) ABSTRACT

To provide an image processing system that makes it easy to adjust the position and posture of a camera or the like, the image processing system includes an image acquisition unit configured to acquire an image signal formed by an imaging unit that captures an optical image having a low-distortion region and a high-distortion region, a characteristics information acquisition unit configured to acquire characteristics information regarding characteristics of the optical image, and a display signal generation unit configured to form information indicating a boundary between the low-distortion region and the high-distortion region based on the characteristics information acquired by the characteristics information acquisition unit, and generate a display signal for superimposing the information indicating the boundary on the image signal.

26 Claims, 12 Drawing Sheets

(56) References Cited

U.S. PATENT DOCUMENTS

2019/0273889 A1    9/2019   Aihara
2021/0127086 A1    4/2021   Aihara

FOREIGN PATENT DOCUMENTS

JP    2010-095202 A    4/2010
WO    2013/008623 A1   1/2013
WO    2019/123840 A1   6/2019

\* cited by examiner

IMAGE PROCESSING SYSTEM, IMAGE PROCESSING METHOD, STORAGE MEDIUM, IMAGE PICKUP APPARATUS, AND OPTICAL UNIT

BACKGROUND OF THE INVENTION

Field of the Invention

The present invention relates to an image processing system capable of image recognition, an image processing method, a storage medium, an image pickup apparatus, and an optical unit.

Description of the Related Art

In recent years, there has been a demand to replace a rear-view mirror mounted on a vehicle with an electronic rear-view mirror. For example, Japanese Patent Application Laid-Open No. 2010-95202 discloses an electronic rear-view mirror system which is constituted by imaging means that sets a rear side outside a vehicle as an imaging range and display means inside the vehicle, and the electronic rear-view mirror system displaying an image captured by the imaging means on a display inside the vehicle so that a driver can confirm the state of the rear side outside the vehicle.

On the other hand, there is a rearward confirmation system that allows a driver to confirm a blind spot behind a vehicle when the vehicle moves back, or the like. Japanese Patent Application Laid-Open No. 2004-345554 discloses a rearward confirmation system in which a camera is installed so as to image a side behind a vehicle, and a captured image is displayed inside the vehicle, so that a driver can confirm a blind spot behind the vehicle when the vehicle moves back, or the like.

A camera as an imaging unit that captures an image for the above-mentioned electronic rear-view mirror is required to have a high resolution so that a driver can check a relatively distant rear view more accurately. On the other hand, the camera for the rearward confirmation system checks safety in a wider range including a blind spot behind the vehicle and a rear side in order to avoid a collision when the vehicle moves back, or the like, and thus the camera is required to image a larger range.

Thus, in a case where the electronic rear-view mirror system and the rearward confirmation system are mounted on a vehicle at the same time, an in-vehicle image processing system becomes complicated when the camera for the electronic rear-view mirror system and the camera for the rearward confirmation system are separately mounted. Such a problem also occurs in, for example, an automatic driving system that performs automated driving or the like by disposing a plurality of cameras to image a situation around the vehicle.

On the other hand, the number of cameras installed in a vehicle can be reduced by adopting a camera using, for example, a special ultra-wide-angle lens. However, although a wide angle of view can be obtained, there are a high-resolution area (low-distortion area) and a low-resolution area (high-distortion area), and thus it is difficult to ascertain whether a high-resolution area (low-distortion area) is correctly aligned with an imaging target to be noted. There was a problem that it was extremely difficult to make an adjustment for installing such a camera.

Thus, in view of the above-mentioned problem, one object of the present invention is to provide an image processing system in which at least one of the position or posture in which a camera is installed can be easily adjusted.

SUMMARY OF THE INVENTION

In order to achieve the above-mentioned object, an image processing system according to one aspect of the present invention includes at least one processor or circuit configured to function as an image acquisition unit configured to acquire an image signal formed by an imaging unit that captures an optical image having a low-distortion region and a high-distortion region, a characteristics information acquisition unit configured to acquire characteristics information regarding characteristics of the optical image, and a display signal generation unit configured to form information indicating a boundary between the low-distortion region and the high-distortion region based on the characteristics information acquired by the characteristics information acquisition unit, and generate a display signal for superimposing the information indicating the boundary on the image signal.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

In a first embodiment, description will be given of an improved method that achieves both a high-definition display for an electronic rear-view mirror and a display for confirming the surroundings of a vehicle such as a wide-range rear side with a small number of cameras.

Figure 1:
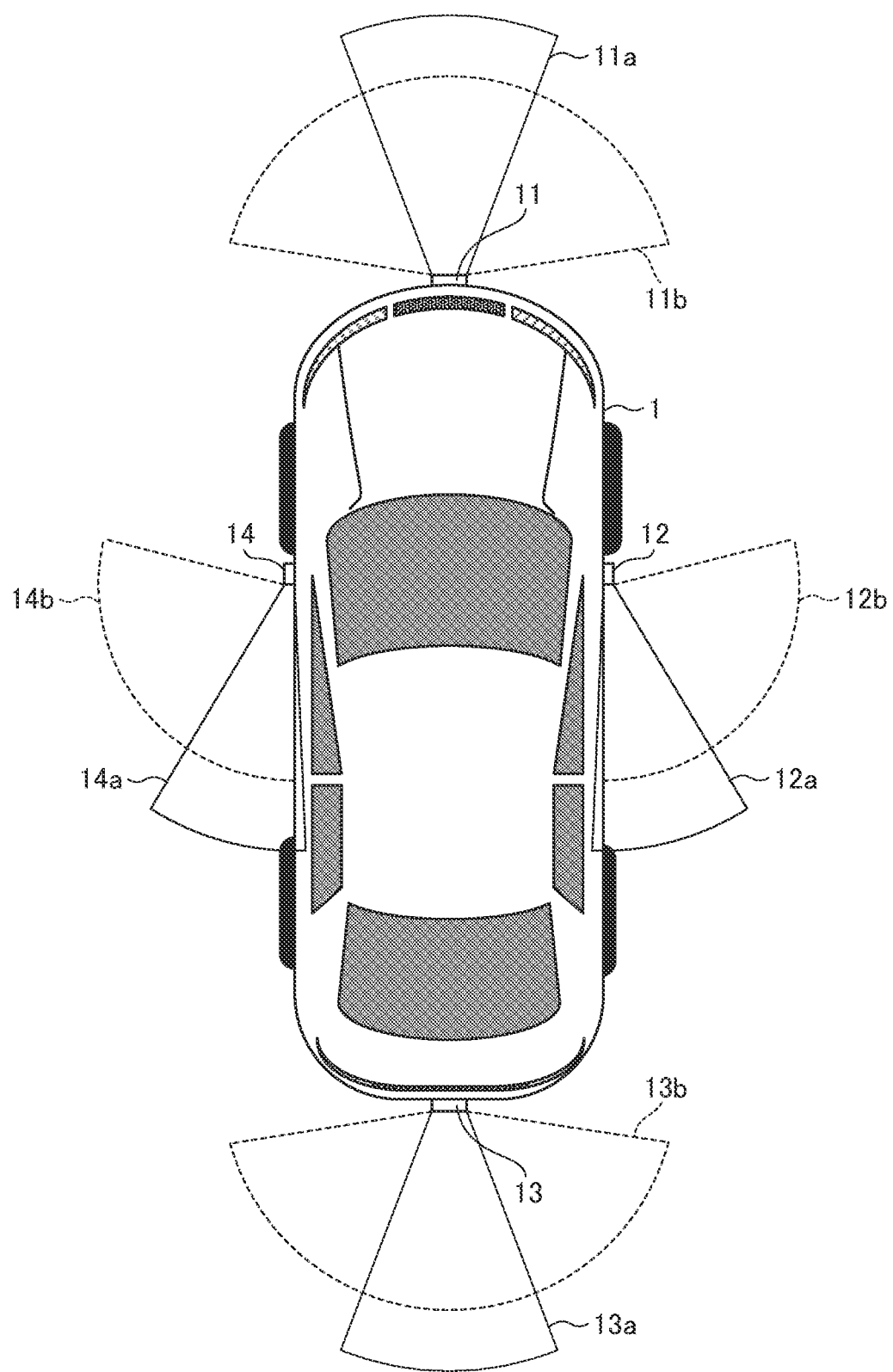
FIG. 1 is a diagram illustrating a positional relationship between a vehicle and an imaging unit in an image processing system in a first embodiment.

FIG. 1 is a diagram illustrating a positional relationship between a vehicle and an imaging unit in an image processing system in the first embodiment.

In the first embodiment, as illustrated in FIG. 1, camera units 11, 12, 13, and 14 are respectively installed on the front side, the right side, the rear side, and the left side of a vehicle 1 which is an automobile as a mobile object. Note that, although four camera units are provided in the first embodiment, the number of camera units is not limited to four, and at least one or more camera units may be provided.

The camera units 11 to 14 are installed so as to have the front side, the right side, the rear side, and the left side of the vehicle 1 as the mobile object as imaging ranges, and function as imaging units.

The camera units 11 to 14 have substantially the same configuration, and each of which includes an imaging element that captures an optical image and an optical system that forms an optical image on a light receiving surface of the imaging element.

For example, the optical axes of the optical systems of the camera units 11 and 13 are installed so as to be substantially horizontal, and the optical axes of the optical systems of the camera units 12 and 14 are installed so as to face slightly downward from the horizontal.

In addition, each of the optical systems included in the camera units 11 to 14 used in a first embodiment is configured to be able to obtain a high-definition image at a narrow angle of view around the optical axis and obtain a low-resolution captured image at a wide angle of view. Note that, reference numerals 11a to 14a denote an imaging angle of view at which a high-resolution and low-distortion image can be captured, and reference numerals 11b to 14b denote an imaging angle of view at which a low-resolution and high-distortion image can be captured.

The optical systems included in the camera units 11 to 14 in the first embodiment will be described with reference to FIGS. 2A and 2B. Note that, although the optical systems of the respective camera units 11 to 14 may not have to have the same characteristics, it is assumed that the optical systems included in the camera units 11 to 14 have substantially the same characteristics in the first embodiment, and the optical systems included in the camera unit 11 will be exemplarily described.

FIGS. 2A and 2B are diagrams illustrating optical characteristics of the imaging units in the first embodiment of the present invention, and FIG. 2A is a diagram in which an image height y at each half angle of view on the light receiving surface of the imaging element in the optical system included in the camera unit 11 in the first embodiment is shown in a contour line shape.

FIG. 2B is a diagram illustrating projection characteristics showing a relationship between an image height y and a half angle of view θ of the optical system included in the camera unit 11 in first embodiment. In FIG. 2B, the half angle of view (an angle formed by an optical axis and an incident light beam) θ is shown as a horizontal axis, and an imaging height (image height) y on a sensor surface (image surface) of the camera unit 11 is shown as a vertical axis.

As illustrated in FIG. 2B, the optical system included in the camera unit 11 in the first embodiment is configured such that a projection characteristic y(θ) differs between a region having less than a predetermined half angle of view θa and a region having a half angle of view θa or more. Thus, when the amount of increase in the image height y with respect to the half angle of view θ per unit is set to be a resolution, the resolution differs depending on a region. It can also be said that this local resolution is expressed by a differential value dy(θ)/dθ at the half angle of view θ of the projection characteristic y(θ). That is, it can be said that the larger an inclination of the projection characteristic y(θ) in FIG. 2B, the higher the resolution. Further, it can also be said that the larger an interval of the image height y at each half angle of view having a contour line shape in FIG. 2A, the higher the resolution.

In the first embodiment, a region close to the center which is formed on the sensor surface when the half angle of view θ is less than the predetermined half angle of view θa is referred to as a high-resolution region 10a, and a region close to the outside in which the half angle of view θ is equal to or larger than the predetermined half angle of view θa is referred to as a low-resolution region 10b. Note that, in the first embodiment, a circle at a boundary between the high-resolution region 10a and the low-resolution region 10b is referred to as a resolution boundary, and a boundary image on a display screen corresponding to the resolution boundary is referred to as a display resolution boundary or simply a boundary image. Note that, the boundary image (display resolution boundary) displayed on the display screen does not have to be circular. For convenience, the boundary image may be rectangular or the like.

Note that, in the first embodiment, the high-resolution region 10a is a low-distortion region with relatively a small distortion, and the low-resolution region 10b is a high-distortion region with relatively a large distortion. Thus, in the first embodiment, the high-resolution region and the low-resolution region correspond to the low-distortion region and the high-distortion region, respectively, and the high-resolution region and the low-resolution region may be referred to as a low-distortion region and a high-distortion region, respectively. On the contrary, the low-distortion region and the high-distortion region may be referred to as a high-resolution region and a low-resolution region, respectively.

The optical system included in the camera unit 11 in the first embodiment is configured such that the projection characteristic y(θ) thereof is larger than f×θ in the high-resolution region (low-distortion region) 10a (f is a focal length of the optical system included in the camera unit 11). In addition, the projection characteristic y(θ) in the high-resolution region (low-distortion region) is set to be different from the projection characteristic in the low-resolution region (high-distortion region).

Further, when θmax is a maximum half angle of view of the optical system included in the camera unit 11, it is preferable that a ratio θa/θmax between θa and θmax be equal to or greater than a predetermined lower limit value, and for example, 0.15 to 0.16 are preferable as the predetermined lower limit value.

Further, it is preferable that the ratio θa/θmax between θa and θmax be equal to or less than a predetermined upper limit value and be preferably 0.25 to 0.35, for example. For example, in a case where θmax is set to 90 degrees, the predetermined lower limit is set to 0.15, and the predetermined upper limit is set to 0.35, it is preferable that θa be determined in the range of 13.5 to 31.5 degrees.

Further, the optical system included in the camera unit 11 is configured such that the projection characteristic y(θ) thereof also satisfies the following Equation 1.

$$1 < \frac{f \times \sin\theta_{max}}{y(\theta_{max})} \leq A \quad \text{(Equation 1)}$$

As described above, f is a focal length of the optical system included in the camera unit 11, and A is a predetermined constant. A center resolution can be made higher than that of a fisheye lens in an orthographic projection method (y=f×sin θ) having the same maximum imaging height by setting the lower limit value to 1, and good optical performance can be maintained while obtaining an angle of view equivalent to that of a fisheye lens by setting the upper limit value to A. The predetermined constant A may be determined in consideration of the balance between the high-resolution region and the low-resolution region and is preferably set to 1.4 to 1.9.

By configuring the optical system as described above, a high resolution can be obtained in the high-resolution region 10a, while it is possible to reduce the amount of increase in an image height y with respect to a half angle of view θ per unit and capture a wider angle of view in the low-resolution region 10b. Thus, it is possible to obtain a high resolution in the high-resolution region 10a while setting an imaging range to a wide angle of view equivalent to that of a fisheye lens.

Further, in the first embodiment, since the high-resolution region (low-distortion region) is set to have characteristics close to a central projection method (y=f×tan θ) and an equidistant projection method (y=f×θ), which are projection characteristics of a normal optical system for imaging, an optical distortion is small, and it is possible to perform a fine display. Thus, a natural depth perception can be obtained when visually observing surrounding vehicles such as a preceding vehicle and a following vehicle, and good visibility can be obtained by suppressing deterioration of image quality.

Figure 2:
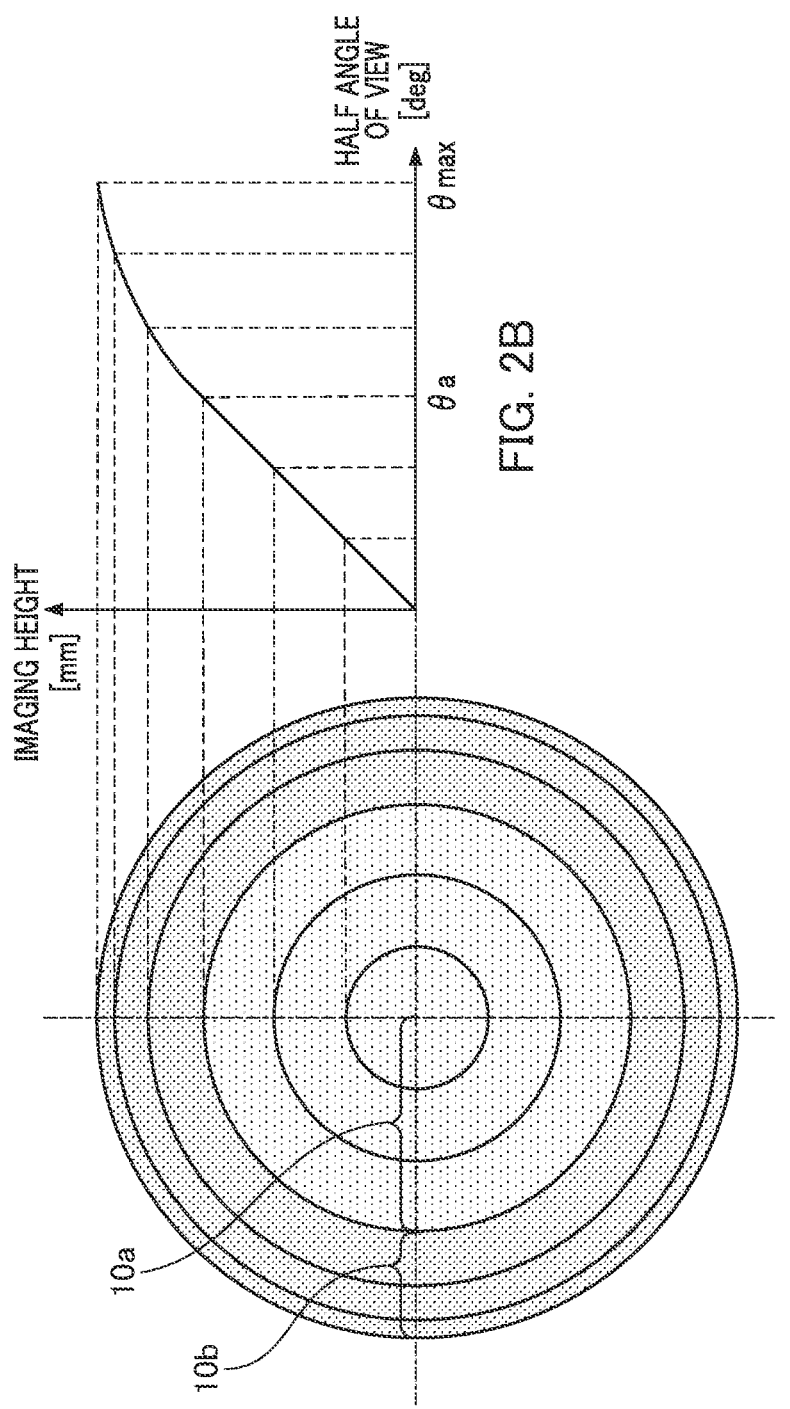
FIGS. 2A and 2B are diagrams illustrating optical characteristics of the imaging unit in the first embodiment.

Note that the same effect can be obtained as long as a projection characteristic y(θ) satisfying the condition of the above-mentioned Equation 1, and thus the present invention is not limited to the projection characteristic illustrated in FIG. 2. Note that, in the first embodiment, an optical system having a projection characteristic y(θ) satisfying the above-mentioned Equation 1 may be referred to as a different-angle-of-view lens.

Note that the high-resolution regions 10a of the optical systems of the camera units 11 to 14 correspond to the imaging angles of view 11a to 14a, and the low-resolution regions 10b correspond to the imaging angles of view 11b to 14b.

For the camera units 11, 12 and 14 mounted on the front/right/left side of the vehicle, an optical system having a projection characteristic y(θ) that satisfies equation 2 can be used instead of a different-angle-of-view lens. Compared to a different-angle-of-view lens, this optical system has roughly opposite high-resolution and low-resolution regions. Such an optical system is sometimes called a reverse-different-angle-of-view lens.

$$0.2 < 2 \ast f \ast \tan(\theta_{max}/2)/y \ast (\theta_{max}) < 0.92 \quad \text{(Equation 2)}$$

Next, a configuration of the image processing system in the first embodiment will be described with reference to FIG. 3.

Figure 3:
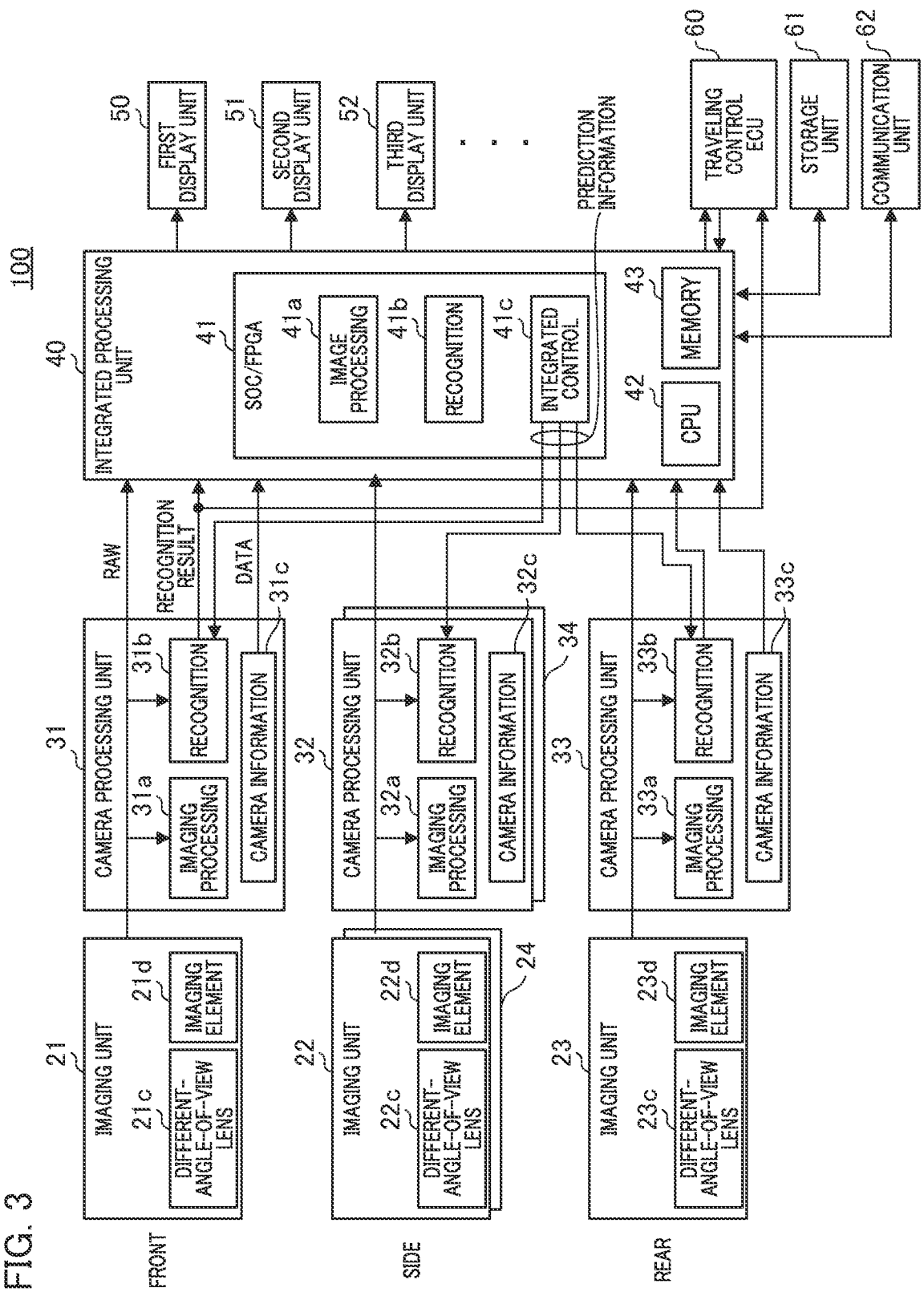
FIG. 3 is a functional block diagram illustrating a configuration of the image processing system in the first embodiment.

FIG. 3 is a functional block diagram illustrating a configuration of the image processing system in the first embodiment.

In FIG. 3, an image processing system 100 is mounted on a vehicle 1 as the mobile object, and imaging units 21 to 24 and camera processing units 31 to 34 are disposed in the housings of the camera units 11 to 14, respectively.

The imaging units 21 to 24 include different-angle-of-view lenses 21c to 24c and imaging elements 21d to 24d such as a CMOS image sensor and a CCD image sensor, respectively. Here, each of the imaging units 21 to 24 functions as an image acquisition unit, and each image acquisition unit acquires an image signal from an imaging unit that captures an optical image having a low-distortion region and a high-distortion region. Further, in the first embodiment, a plurality of image acquisition units disposed at different positions are provided.

The different-angle-of-view lenses 21c to 24c as optical systems are constituted by one or more optical lenses, have a projection characteristic y(θ) satisfying the condition of Equation 1, and form an optical image having a low-distortion region and a high-distortion region on a light receiving surface of each of the imaging elements 21d to 24d. The imaging elements 21d to 24d function as imaging units and perform photoelectric conversion on an optical image to output an imaging signal. For example, RGB color filters are arranged for each pixel on the light receiving surfaces of the imaging elements 21d to 24d. The RGB arrangement is, for example, a Bayer arrangement. It should be noted that a reverse-different-angle-of-view lens can be used instead of the different-angle-of-view lens for the front and sides.

Thus, the imaging element is configured such that, for example, R, G, R, G signals are sequentially output from a predetermined row according to a Bayer arrangement, and G, B, G, B signals are sequentially output from an adjacent row.

Reference numerals 31 to 34 denote camera processing units, which are accommodated in the same housing of the camera units 11 to 14 together with the imaging units 21 to 24 and process the imaging signals output from the imaging units 21 to 24, respectively. Note that the details of the imaging unit 24 and the camera processing unit 34 and their wiring lines are omitted in FIG. 3 for convenience.

The camera processing units 31 to 34 include image processing units 31a to 34a, recognition units 31b to 34b, and camera information units 31c to 34c, respectively. The image processing units 31a to 34a perform image processing on the imaging signals output from the imaging units 21 to 24, respectively. Note that some or all of the image processing may be performed by stacked signal processing units within the imaging elements 21d to 24d.

Specifically, the image processing units 31a to 34a perform De-Bayer processing on image data which is input from the imaging units 21 to 24 according to a Bayer arrangement and convert the image data into RGB image data in a raster format. Furthermore, various correction processes such as white balance adjustment, gain/offset adjustment, gamma processing, color matrix processing, and reversible compression processing are performed. However, a so-called RAW image signal is formed without performing non-reversible compression processing or the like.

The recognition units 31b to 34b perform image recognition of predetermined objects (for example, automobiles, people, obstacles, and the like) from an RAW image signal, for which distortion correction has not been performed, which is image-processed by the image processing units 31a to 34a. That is, the recognition units 31b to 34b recognize image signals corresponding to a low-distortion region in the state of the RAW image signal without performing distortion correction, and output first image recognition results.

That is, the recognition units 31b to 34b in the first embodiment perform image recognition processing on the RAW image signal obtained from at least the high-resolution region 10a and recognize a predetermined object.

At this time, the recognition units 31b to 34b may also perform image recognition processing on the RAW image signal obtained from the low-resolution region 10b. However, since distortion correction has not been performed on the RAW image signal, an image in a peripheral portion of the different-angle-of-view lens has a large distortion, and the reliability of recognition is lowered.

Alternatively, the recognition units 31b to 34b may cut out the RAW image signal obtained from the high-resolution region 10a and perform image recognition processing only on the RAW image signal obtained from the high-resolution region 10a.

Note that, at this time, it is preferable that the region to be cut out has a rectangular shape for image recognition processing. Further, the rectangular region to be cut out may be only a part of the high-resolution region 10a (for example, a rectangle inscribed in the high-resolution region 10a), or may be a rectangle including both the high-resolution region 10a and the low-resolution region 10b.

Here, the recognition units 31b to 34b function as first image recognition units that perform image recognition on image signals in at least a partial region among the image signals acquired by the imaging units (image acquisition units) and output the first image recognition results. Note that, in the first embodiment, the partial region is a region corresponding to a low-distortion region.

The recognition units 31b to 34b transmit the type of object and a set of coordinates to an integrated processing unit 40 as recognition results.

On the other hand, the recognition units 31b to 34b receive the type of object that straddles between the camera units and prediction information which is a set of information regarding a moving direction of the object or priority recognition region information from an integrated control unit 41c of the integrated processing unit 40. The prediction information will be described later.

Here, an output of the recognition unit 31b of the camera unit 11 installed for the front surface is also directly supplied to a traveling control unit (ECU) 60. This is because it may be necessary to control traveling so as to immediately stop the traveling or avoid obstacles, based on recognition results of the obstacles which are obtained by the recognition unit 31b.

The camera information units 31c to 34c hold camera information specific to the camera units 11 to 14 in a memory in advance. The camera information units can also temporarily hold information from various sensors and the like provided in the camera units 11 to 14. The camera information includes characteristics information (resolution boundary information and the like), as illustrated in FIG. 2, of the optical image formed by, for example, the different-angle-of-view lenses 21c to 24c. In addition, the camera information includes the number of pixels of the imaging elements 21d to 24d, information on mounting position coordinates and posture (pitch, roll, yaw, and the like) in vehicle coordinates of the camera unit, an imaging direction, and the like. The camera information may include information such as gamma characteristics, sensitivity characteristics, and a frame rate.

Further, the camera information may include information regarding an image processing method such as a reversible compression method when the image processing units 31a to 34a generate an RAW image signal, and an image format.

Note that the mounting position coordinates may be stored in a memory in the camera information unit in advance because a mounting position for a vehicle is often determined for each camera unit. Further, the posture coordinates of the camera unit are coordinates relative to the vehicle 1 and may be acquired from an encoder (not illustrated) provided in the camera unit. Alternatively, the posture coordinates may be acquired using a three-dimensional acceleration sensor or the like.

Further, the information regarding the imaging direction may be acquired using, for example, a geomagnetic sensor. Since the resolution boundary information of the camera is determined by the design of a lens, it is assumed that the resolution boundary information is stored in the memory in the camera information unit in advance.

The camera information is unique information of the imaging units 21 to 24, and the pieces of camera information are different from each other, are transmitted to the integrated processing unit 40, and referred to when image processing or the like is performed in the integrated processing unit 40.

Note that a CPU as a computer and a memory for storing a computer program as a storage medium are built in the camera processing units 31 to 34. Further, the CPU is configured to control each unit in the camera processing units 31 to 34 by executing the computer program in the memory.

Note that, in the first embodiment, the image processing units 31a to 34a and the recognition units 31b to 34b use hardware such as a dedicated circuit (ASIC) or a processor (a reconfigurable processor, a DSP). Thereby, it is possible to realize high-speed image recognition for the high-resolution region and increase the possibility of avoiding a fender bender of a mobile object. Note that the image processing units 31a to 34a may have a distortion correction function.

Note that some or all of the functional blocks inside the camera processing units 31 to 34 may be realized by causing the CPU to execute a computer program stored in the memory, but in this case, it is preferable to increase the speed of processing of the CPU.

Reference numeral 40 denotes an integrated processing unit which includes a system on chip (SOC)/field programmable gate array (FPGA) 41, a CPU 42 as a computer, and a memory 43 as a storage medium. The CPU 42 performs various controls of the overall image processing system 100 by executing a computer program stored in the memory 43. Note that, in the first embodiment, the integrated processing unit 40 is accommodated in a housing separate from the camera unit.

The SOC/FPGA 41 includes an image processing unit 41a, a recognition unit 41b, and an integrated control unit 41c.

The image processing unit 41a acquires respective RAW image signals from the camera processing units 31 to 34 and acquires camera information of the camera units 11 to 14 from the camera information units 31c to 34c.

As described above, the camera information includes optical characteristics of the different-angle-of-view lenses 21c to 24c, the number of pixels of the imaging elements 21d to 24d, photoelectric conversion characteristics, gamma characteristics, sensitivity characteristics, format information of RAW image signals, mounting coordinates and posture information in vehicle coordinates of the camera units, and the like.

The image processing unit 41a performs resolution conversion on the respective RAW image signals obtained from the camera processing units 31 to 34 based on the pieces of camera information and perform distortion correction on image signals obtained from the respective low-resolution regions 10b of the imaging units 21 to 24.

In the first embodiment, the image processing unit 41a does not perform distortion correction because the image signal obtained from the high-resolution region 10a has almost no distortion. However, the image processing unit 41a may also perform simple distortion correction on the image signal obtained from the high-resolution region 10a. Further, the image processing unit 41a appropriately performs non-reversible compression processing or the like on the respective RAW image signals obtained from the camera processing units 31 to 34.

Further, the image processing unit 41a synthesizes the image signals of the low-resolution regions 10b of the imaging units 21 to 24 on which distortion correction has been performed and the image signals of the high-resolution regions 10a so as to be smoothly connected to each other, thereby forming the overall image for every imaging units 21 to 24.

Note that, in a case where distortion correction is performed on both the image signal of the low-resolution region 10b and the image signal obtained from the high-resolution region 10a, the RAW image signals obtained by the image processing units 31a to 34a may be subjected to distortion correction as they are.

The recognition unit 41b performs image recognition processing on the overall image for every imaging units 21 to 24 after at least the low-resolution region is subjected to distortion correction, and performs image recognition of predetermined objects (for example, automobiles, people, obstacles, and the like) in the overall image for every imaging units 21 to 24. That is, the recognition unit 41b performs distortion correction on an image signal corresponding to at least the low-resolution region (high-distortion region) and then performs image recognition to output second image recognition results.

At that time, the recognition results (the type and coordinates of an object) which are obtained by the recognition units 31b to 34b are also referred to. Note that, in the first embodiment, the recognition unit 41b performs image recognition on the overall image for every imaging units 21 to 24, but image recognition may not be performed on the overall image. For example, image recognition may not be performed on a peripheral portion of an image.

That is, an image recognition region of the recognition unit 41b may include, for example, a region recognized by the recognition units 31b to 34b and may be a wider region.

That is, the recognition unit 41b functions as a second image recognition unit that performs image recognition on an image signal of a region wider than a partial region on which image recognition has been performed by the first image recognition unit, and outputs the second image recognition results, the image signal including the partial region among image signals acquired by the image acquisition units. Note that the second image recognition unit performs image recognition on both image signals corresponding to the high-resolution region 10a as a low-distortion region and the low-resolution region 10b as a high-distortion region, and outputs the second image recognition result.

In the first embodiment, the image processing unit 41a synthesizes the images obtained from the camera units 12 to 14 as a plurality of imaging units so as to be connected, thereby forming a panoramic synthesized image.

In this case, the images of the plurality of imaging units to be connected are set such that at least portions of imaging angles of view have an overlap region of a predetermined amount or more.

That is, the imaging ranges of the camera units 12 and 13 are disposed to overlap each other. Further, the imaging ranges of the camera units 13 and 14 are disposed to overlap each other. Moreover, in the first embodiment, the imaging ranges of the low-distortion regions of at least two image acquisition units are disposed to overlap each other.

Further, the recognition unit 41b performs image recognition on the panoramic synthesized image. Thereby, for example, it becomes possible to recognize an image of an object which is captured so as to straddle the angles of view of the plurality of imaging units. That is, this is because, although the overall image of the object may not be known from the individual overall images from the respective imaging units, almost the entire object is shown in the panoramic synthesized image, and image recognition can be performed through image processing.

For example, in a case where the recognition results obtained by the recognition units 31b to 34b and the recognition results obtained by the recognition unit 41b are different from each other, the integrated control unit 41c outputs integrated image recognition results by adopting the more reliable recognition results.

For example, the ratio of an object recognized by the recognition units 31b to 34b in a screen and the ratio of the same object recognized by the recognition unit 41b in the screen are compared with each other, and the recognition results having a larger ratio may be determined to have a higher reliability and adopted.

Alternatively, in the case of an object that straddles both the inside of the high-resolution region and the low-resolution region, the recognition results obtained by the recognition unit 41b may be determined to have a higher reliability than that of the recognition results obtained by the recognition units 31b to 34b, and may be adopted. Alternatively, in a case where the position of the object recognized by the recognition units 31b to 34b is a peripheral portion of the screen, it is determined that the reliability is low, and the recognition results obtained by the recognition unit 41b may be determined to have a higher reliability and adopted.

Alternatively, the recognition unit 41b performs image recognition only on the low-resolution region in a state where the low-resolution region is subjected to distortion correction, and in a case where there is an object that straddles the low-resolution region and the high-resolution region, the recognition unit 41b may perform image recognition on the object. That is, it may be considered that recognition performed by the recognition units 31b to 34b is more reliable for an object existing only in the high-resolution region, and the recognition unit 41b may be controlled so as not to perform image recognition processing.

Here, the integrated control unit 41c functions as an integrated processing unit that outputs integrated image recognition results based on the reliability of the first image recognition results and the reliability of the second image recognition results.

In addition, the image processing unit 41a forms a signal for displaying a desired image among the overall image for every imaging units 21 to 24, the panoramic synthesized image obtained by connecting them, and the like on a first display unit 50, a second display unit 51, a third display unit 52, and the like. In addition, a frame for highlighting a recognized object, CG for information on the type, size, position, speed, and the like of the object, or a warning, and the like are generated. Further, it is possible to generate CG of a boundary image for displaying a boundary based on characteristics information of an optical system such as display resolution boundary information acquired from the first camera information units 31c to 34c. Further, in order to represent the boundary, it is only required that information indicating the boundary can be generated without generating a display image.

In addition, display processing for superimposing the CG and characters on an image is performed. Here, the first display unit 50, the second display unit 51, the third display unit 52, and the like function as display units and display an image signal, integrated image recognition results, and the like.

Furthermore, in the first embodiment, the integrated control unit 41c is configured to share information regarding a recognized object among the plurality of camera units. That is, for example, it is assumed that an object recognized by the camera unit 14 is moving in the direction of the angle of view of the camera unit 11. In this case, the integrated control unit 41c transmits the type of object and prediction information including information regarding the moving direction of the object or priority recognition region information to the recognition unit 31b of the camera unit 11.

By sharing such prediction information by the recognition units 31b to 34b of the camera units 11 to 14, the accuracy of image recognition in the recognition units 31b to 34b of the camera units 11 to 14 can be improved. Note that an advantage of sharing such prediction information is especially effective when the recognition units 31b to 34b of the camera units 11 to 14 are separate from the recognition units 41b of the integrated processing unit 40.

Further, the integrated control unit 41c communicates with the traveling control unit (ECU) 60 and the like via a communication unit (not illustrated) provided inside using a protocol such as CAN, FlexRay, or Ethernet. Thereby, display processing for appropriately changing information to be displayed based on a vehicle control signal received from the traveling control unit (ECU) 60 or the like is performed. That is, for example, the range of an image displayed on the display unit, and the like are changed in accordance with the moving state of the vehicle which is acquired by the vehicle control signal.

Note that the traveling control unit (ECU) 60 is mounted on the vehicle 1 and is a unit having a built-in computer and memory for comprehensively performing drive control, direction control, and the like of the vehicle 1. Information on the traveling of the vehicle (movement state) such as a traveling speed, a traveling direction, a shift lever, a shift gear, the state of a turn signal, and the orientation of the vehicle using geomagnetic sensors and the like is input as a vehicle control signal to the integrated processing unit 40 from the traveling control unit (ECU) 60.

The integrated control unit 41c transmits information such as the type, position, moving direction, and moving speed of a predetermined object (an obstacle or the like) recognized by the recognition unit 41b to the traveling control unit (ECU) 60. Thereby, the traveling control unit (ECU) 60 performs control required to avoid obstacles such as stopping, driving, and the change of a traveling direction of the vehicle. Here, the traveling control unit (ECU) 60 functions as a movement control unit that controls the movement of the vehicle as the mobile object based on integrated image recognition results.

The first display unit 50 is installed, for example, near the center of a front upper part of a driver's seat of the vehicle 1 in a vehicle width direction with a display screen facing the rear of the vehicle, and functions as an electronic rear-view mirror. Note that the first display unit 50 may be configured to be usable as a mirror using a half mirror or the like when it is not used as a display. In addition, the first display unit 50 may be configured to acquire a user's instruction by including a touch panel or an operation button and to be able to output the instruction to the integrated control unit 41c.

The second display unit 51 is installed, for example, around the operation panel near the center in the vehicle width direction in front of the driver's seat of the vehicle 1. Note that the vehicle 1 as the mobile object is equipped with a navigation system (not illustrated), an audio system, and the like.

In addition, for example, various control signals and the like from a navigation system, an audio system, and the traveling control unit (ECU) 60 can be displayed on the second display unit. In addition, the second display unit is configured to include a touch panel and operation buttons so as to be able to acquire a user's instruction.

The third display unit 52 is, for example, a display unit of a tablet terminal, and can perform display by being connected to the integrated processing unit 40 in a wired manner and can also receive and display an image in a wireless manner via the communication unit 62.

When the positions and postures of the camera units 11 to 14 are adjusted, an adjustment operation is performed while displaying a screen for adjustment on the display unit of the table terminal connected in a wireless manner. Naturally, the functions of the second display unit 51 and the third display unit 52 that display a control signal received from the navigation system can also be realized by one display device.

Note that a liquid crystal display, an organic EL display, or the like can be used as the display panels of the first display unit 50, the second display unit 51, and the third display unit 52. Note that the number of display units is not limited to three.

Note that some or all of the functional blocks included in the integrated processing unit 40 and the like may be realized by hardware, or may be realized by causing the CPU 42 to execute the computer program stored in the memory 43. As the hardware, a dedicated circuit (ASIC), a processor (a reconfigurable processor, a DSP), or the like can be used.

In addition, a portion or the entirety of the image processing performed by the image processing units 31a to 34a may be performed by the image processing unit 41a of the integrated processing unit 40. That is, in the first embodiment, for example, the image acquisition unit and the first image recognition unit are accommodated in the housing of the same camera unit, and the camera unit and the second image recognition unit are accommodated in different housings. However, for example, the first image recognition unit may be accommodated in the housing of the integrated processing unit 40 together with the second image recognition unit.

Note that, in the first embodiment, the integrated processing unit 40 is mounted on the vehicle 1 as the mobile object, but the processing of some of the image processing unit 41a, the recognition unit 41b, and the integrated control unit 41c of the integrated processing unit 40 may be performed by, for example, an external sever or the like through a network. In this case, for example, the imaging units 21 to 24 as image acquisition units are mounted on the vehicle 1 as the mobile object, but for example, some of the functions of the camera processing units 31 to 34 and the integrated processing unit 40 can be processed by an external server or the like. In addition, it is also possible to provide some or all of the functions of the integrated processing unit 40 to the traveling control unit (ECU) 60.

Reference numeral 61 denotes a storage unit, which stores the overall image for every imaging units 21 to 24 which is generated by the integrated processing unit 40 and a panoramic synthesized image. Further, a predetermined frame indicating a recognized object, CG such as characters and warnings, and images having CG superimposed thereon and displayed on the first display unit 50, the second display unit 51, and the like are stored together with the time, GPS information, and the like.

The integrated processing unit 40 can also reproduce the past information stored in the storage unit 61 and display it on the first display unit 50 and the second display unit 51.

Reference numeral 62 denotes a communication unit, which is for communicating with an external server or the like via a network, and can transmit information before being stored in the storage unit 61 or past information stored in the storage unit 61 to the external server or the like and store it in the external server or the like. Further, as described above, an image can also be transmitted to an external tablet terminal or the like and displayed on the third display unit 52, which is the display unit of the tablet terminal. In addition, congestion information and various types of information can also be acquired from an external server or the like and displayed on the first display unit 50, the second display unit 51, or the like via the integrated processing unit 40.

FIGS. 4 to 8 are flowcharts illustrating a series of operations of the integrated processing unit 40 in the first embodiment. Flows of FIGS. 4 to 8 are sequentially performed by the CPU 42 of the integrated processing unit 40 executing the computer program stored in the memory 43.

For example, a start button for starting a camera posture adjustment mode is displayed on the third display unit 52 of the tablet terminal, and the flows of FIGS. 4 to 8 are started when the start button is clicked.

Figure 4:
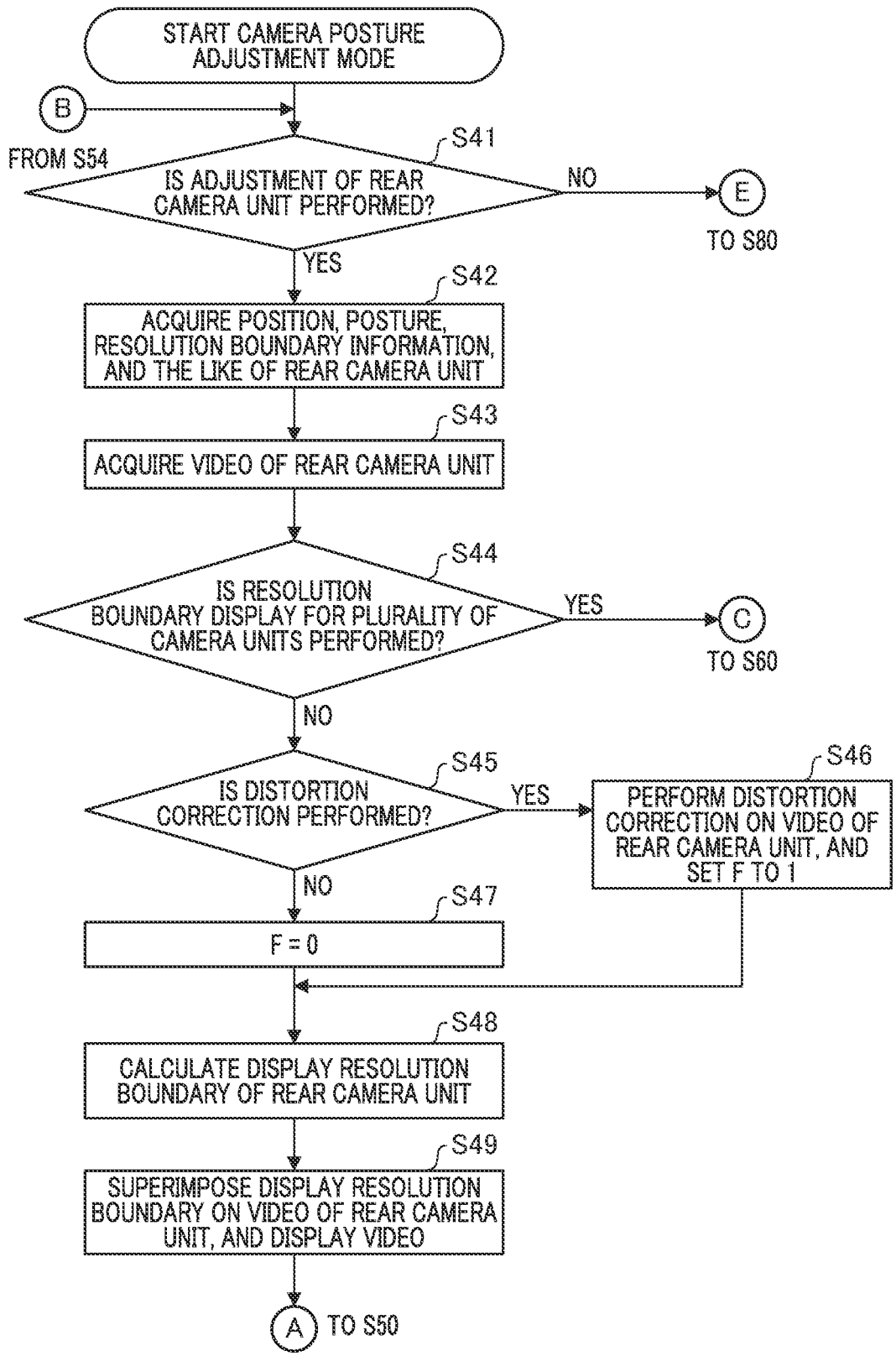
FIG. 4 is a flowchart illustrating a processing flow of a camera processing unit in the first embodiment.

FIG. 4 is a flowchart illustrating a processing flow of the camera processing unit in the first embodiment.

In step S41 of FIG. 4, it is determined whether or not a rear camera is in an adjustment mode. In the case of Yes, the processing proceeds to step S42, and in the case of No, the processing proceeds to step S80 in FIG. 8.

In step S42 (characteristics information acquisition step), the position, posture, resolution boundary information, and the like of the rear camera are acquired from the camera information unit 33c of the rear camera unit 13. Here, step S42 functions as a characteristics information acquisition unit that acquires characteristics information regarding the characteristics of the optical image.

A video is acquired from the rear camera unit 13 in step S43 (image acquisition step), it is determined in step S44 whether or not to perform resolution boundary display for the plurality of camera units, and in the case of No, the processing proceeds to step S45.

In step S45, it is determined whether or not to perform distortion correction, and in the case of No, the processing proceeds to step S47 to set the flag F to 0, and then the processing proceeds to step S48. In the case of Yes, the image processing unit 41a performs distortion correction on a video of the rear camera unit 13 in step S46, sets the flag F to 1, and then proceeds to step S48.

In step S48, a display resolution boundary of the rear camera unit 13 is calculated in consideration of whether or not distortion correction has been performed based on the flag F. Then, in step S49 (display signal generation step), the calculated display resolution boundary is superimposed on the video obtained from the rear camera unit 13, and the video is displayed on, for example, the third display unit 52. That is, for example, the video is displayed on the third display unit 52 of the tablet terminal used at the time of adjusting the camera unit via the communication unit 62. Here, step S48 functions as a display signal generation unit that forms boundary images of the low-distortion region and the high-distortion region based on the characteristics information acquired by the characteristics information acquisition unit and generates a display signal by superimposing the image on the image signal.

Figure 9A:
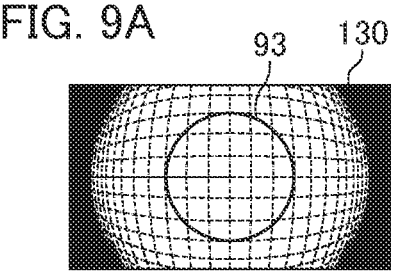
FIGS. 9A to 9H are diagrams illustrating the state of a displayed image and an example of the superimposition of a display resolution boundary.

FIG. 9 is a diagram illustrating an example of the superimposition of a display state of an image and a display resolution boundary, and FIG. 9A is a diagram illustrating an example in which a display resolution boundary 93 is superimposed on a video 130 obtained from the rear camera unit 13, the video having not been subjected to distortion correction. That is, an image displayed when the flag F is 0 is illustrated. On the other hand, FIG. 9B is a diagram illustrating an example in which a boundary image of the display resolution boundary 93 is superimposed on a video 131 obtained from the rear camera unit 13, the video having been subjected to distortion correction. Both FIG. 9A and FIG. 9B are examples of videos displayed on the display unit of the tablet terminal which is the third display unit 52.

Figure 9B:
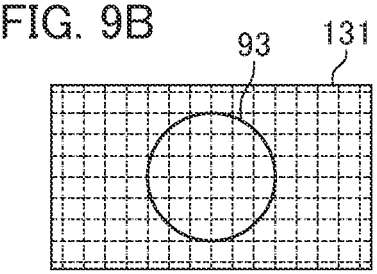

Note that the display resolution boundary 93 displayed in FIG. 9B may be subjected to coordinate conversion according to distortion correction.

Further, when the display resolution boundary 93 is superimposed on an image, CG of an additional boundary image as illustrated in FIG. 10 may be superimposed.

Figure 10A:
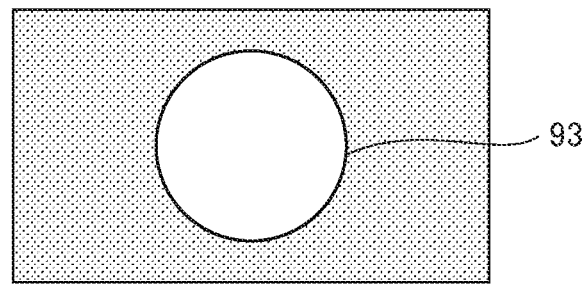
FIGS. 10A and 10B are diagrams illustrating another example of a display resolution boundary 93 superimposed on an image.

FIG. 10 is a diagram illustrating another example of the display resolution boundary 93 superimposed on an image. FIG. 10A is a diagram illustrating an example in which the inside and outside of the display resolution boundary can be seen by making a high-resolution region and a low-resolution region differ in brightness and color with the display resolution boundary 93 as a boundary, in order to distinguish a boundary between the high-resolution region and the low-resolution region.

Note that, in a case where the brightness, color, and the like are different between the inside and the outside of the display resolution boundary 93 as illustrated in FIG. 10A, the line itself of the display resolution boundary may not be displayed. That is, the display of the display resolution boundary (boundary image) in the first embodiment includes the display of the boundary without using a line. In addition, a line representing the boundary may be represented by, for example, a double line, and a line on the inner side (the side where the high-resolution region is located) may be represented by a broken line to guide the line of sight inward, thereby making it possible to easily see the inside and outside of the high-resolution region.

Figure 10B:
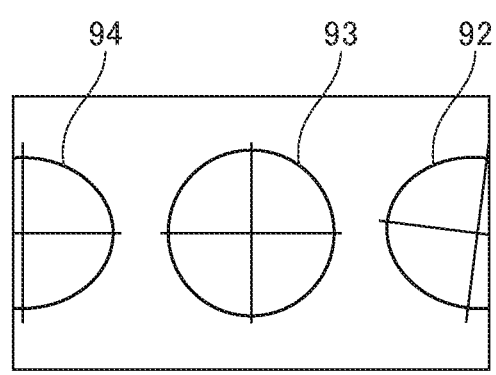

FIG. 10B is a diagram illustrating an example in which, when the camera unit is inclined with respect to a roll axis or the like, a horizontal axis and a vertical axis are added and superimposed on the display resolution boundary 93 so as to easily see the inclination of the camera unit.

Note that, when the display resolution boundary is displayed, the display resolution boundary may be displayed for convenience, for example, as a rectangle. By displaying the display resolution boundary as a rectangle, it is possible to display whether or not it is rolled in an easy-to-understand manner. The rectangle in this case may be, for example, a rectangle inscribed or circumscribed with respect to a circular display resolution boundary.

Figure 5:
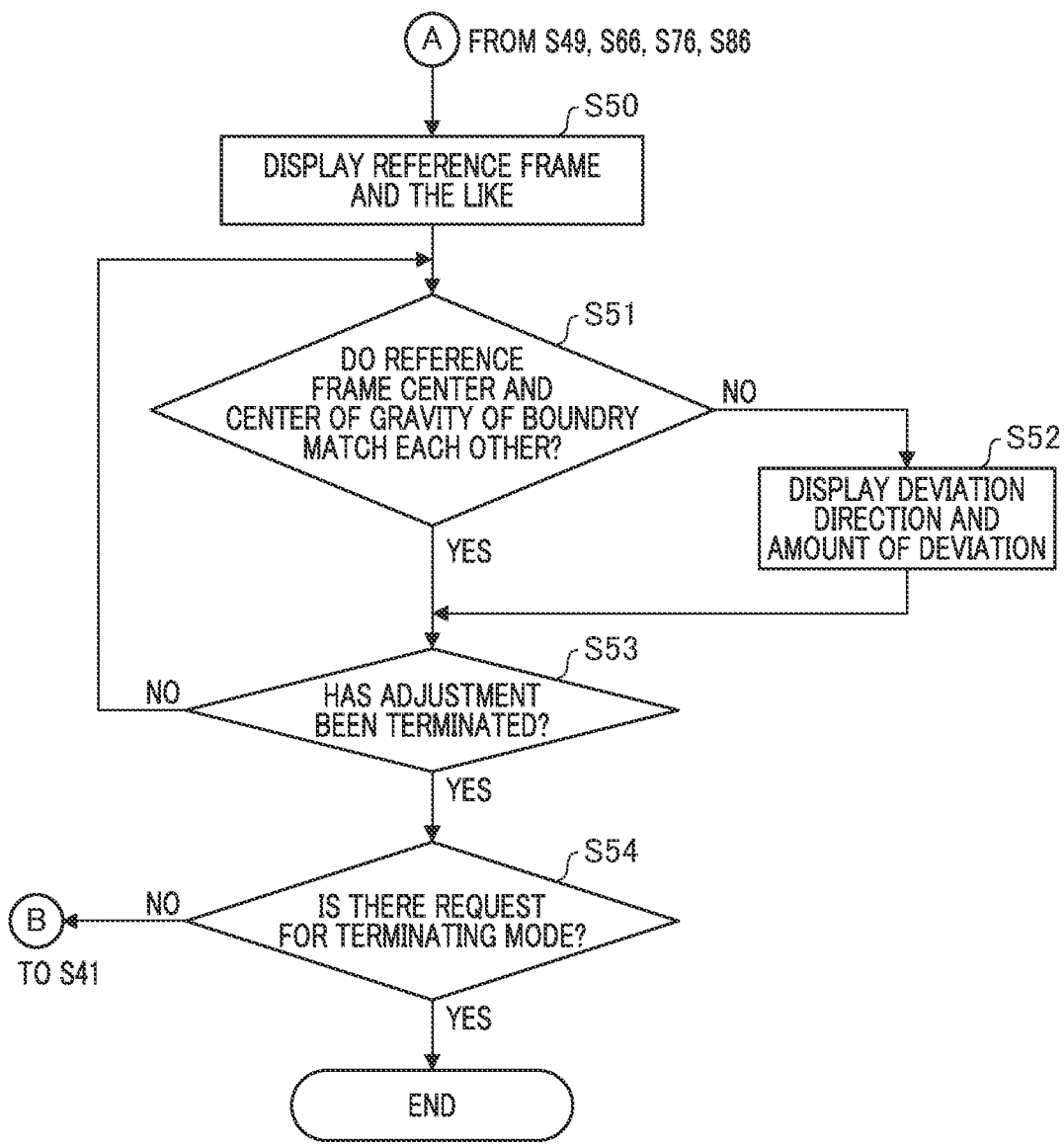
FIG. 5 is a flowchart illustrating processing which continues from FIG. 4.

After an image, the display resolution boundary 93, and the like are output and displayed on the third display unit 52 in step S49 of FIG. 4, the processing proceeds to step S50 of FIG. 5.

FIG. 5 is a flowchart illustrating processing which continues from FIG. 4.

Figure 11A:
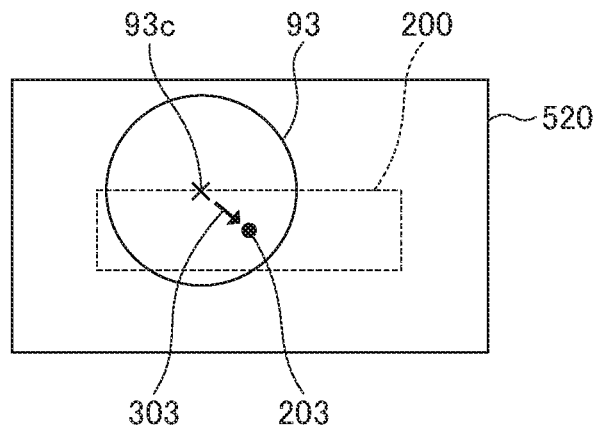
FIGS. 11A to 11C are diagrams illustrating examples of a reference frame and the like displayed on a screen for adjustment in accordance with a flag F.

In step S50, in a case where the flag F is 0 or 1, a reference frame 200 and a reference frame center 203 as illustrated in FIG. 11A are displayed on a screen. Note that, in a case where the flag F is 1, distortion correction is performed, and thus the coordinates of the image displayed on the third display unit 52 and the display resolution boundary 93 are also converted accordingly.

Note that the reference frame 200 may be, for example, a frame in which only four corners are displayed, or for example, four dots or the like, and the frame in the first embodiment also includes such a frame. In addition, the reference frame 200 is set to sufficiently satisfy the rear camera standard setting final rule (MVSS111) according to the US National Highway Traffic Safety Administration (NHTSA). That is, for example, a region where the head of an infant 3 m behind a rear end of a vehicle and 1.5 m away from the center axis of the vehicle in the left-right direction can sufficiently fall is only required to be set as a reference frame.

FIG. 11 is a diagram illustrating an example of a reference frame and the like displayed on a screen for adjustment in accordance with the flag F, and FIG. 11A is a diagram illustrating examples of a reference frame and the like displayed on a screen for adjustment when the flag F is 0 or 1. FIG. 12 is a diagram illustrating an example of an installation position of a reference frame. The screen in FIG. 11A is a screen before distortion correction is performed when the flag F is 0, and is a screen after distortion correction has been performed when the flag F is 1.

In FIG. 11A, for example, a rectangular virtual reference frame 200 and a reference frame center 203 are displayed with respect to the display resolution boundary 93. The reference frame 200 is disposed on a virtual screen with reference to the coordinates of the vehicle 1 at a position 205 illustrated in FIG. 12 (for example, at a position 2 m away from the rear end of vehicle 1, perpendicular to the moving direction of the vehicle 1, 4 m horizontally to a plane perpendicular to the ground, and 1 m from the ground).

The direction of the vehicle 1 may be acquired from an output of a geomagnetic sensor or the like via the traveling control unit (ECU) 60. Note that the reference frame 200 and the reference frame center 203 may be displayed by actually placing a reference plate at the position 205 and performing imaging instead of displaying such a virtual image on the screen.

Note that the reference frame 200 corresponds to an image region displayed on the electronic rear-view mirror. For example, in a case where the vehicle 1 moves back, the image processing unit 41a displays only an image signal obtained from the camera unit 13 on the electronic rear-view mirror. At this time, only the image region corresponding to the reference frame 200 can be cut out from the image signal obtained from the camera unit 13 and displayed on, for example, the first display unit 50 as an electronic rear-view mirror. However, during the adjustment of the camera unit 13, the overall image as illustrated in FIG. 11A is displayed on a screen 520 of the third display unit 52 such as a display unit of a tablet terminal, and the position and posture of the camera unit 13 can be adjusted.

Note that, as described above and as illustrated in FIG. 12, the imaging ranges of at least two camera units 12 and 13 and the imaging ranges of the camera units 13 and 14 among the camera units 11 to 14 are disposed to overlap each other. Further, in the first embodiment, the imaging ranges of the low-distortion regions of at least two image acquisition units are disposed to overlap each other.

In step S51 of FIG. 5, it is determined whether or not the reference frame center 203 and a center of gravity 93c of the display resolution boundary 93 match each other. In a case where they match each other, the processing proceeds to step S53. In the case of No, the processing proceeds to step S52, an arrow 303 (guide information) is displayed so as to move the center of gravity 93c of the display resolution boundary 93 toward the reference frame center 203, and then the processing proceeds to step S53. Further, in step S51, the reference frame center 203 and the center of gravity 93c do not necessarily have to match each other. It is only required that most (ideally, the entirety) in the reference frame region can be adjusted to become a high-resolution region. Consequently, when a threshold value is set and the area of the high-resolution region in the reference frame region exceeds the threshold value, the determination result in S51 is Yes, and the processing may proceed to S53.

In this manner, in step S52, it is possible to display a moving direction and the amount of movement for correcting a deviation depending on the orientation and length of the arrow 303. Alternatively, instructions for a moving direction and movement may be given using text or a sound.

Further, in step S52, the position of the center of gravity 93c of the display resolution boundary 93 in horizontal and vertical coordinates may be numerically displayed using, for example, the reference frame center 203 as the center of the horizontal and vertical coordinates of the screen.

These numerical values, the arrow 303, the reference frame 200, and the reference frame center 203 function as guide information for adjusting the posture and the like of the image acquisition unit based on a boundary image. Note that at least one of these may be used as the guide information. For example, only the reference frame 200 may be displayed, and a user may visually adjust the boundary image and the reference frame 200.

Further, steps S50 and S52 also function as a display signal generation step (display signal generation unit).

In step S53, it is determined whether or not the adjustment of the posture and the like of the camera unit 13 has been terminated. For example, an adjustment completion button is displayed on the third display unit 52 of the tablet terminal. Then, it is determined that the adjustment has been completed, for example, in a case where the user adjusts the posture and the like of the camera unit 13 while viewing the screen of the tablet and clicks the adjustment completion button after the adjustment is completed.

In addition, as described above, it is not always necessary to perform adjustment until a deviation between the reference frame center 203 and the center of gravity 93c disappears. It is only required that most (ideally, the entirety) in the reference frame region can be adjusted to be a high-resolution region. Consequently, when a threshold value is set and the area of the high-resolution region in the reference frame region exceeds the threshold value, the determination result in S53 is Yes, and the processing proceeds to S54. In the case of No in step S53, the processing returns to step S51, and in the case of Yes, the processing proceeds to step S54.

In step S54, it is determined whether or not a mode termination request has been made. For example, a termination button for terminating the camera posture adjustment mode is displayed on the third display unit 52 of the tablet terminal, and it is determined that the mode termination request has been made when the user clicks the termination button.

In the case of Yes in step S54, the flows of FIGS. 4 to 8 are terminated. In the case of No, the processing returns to step S41.

Figure 6:
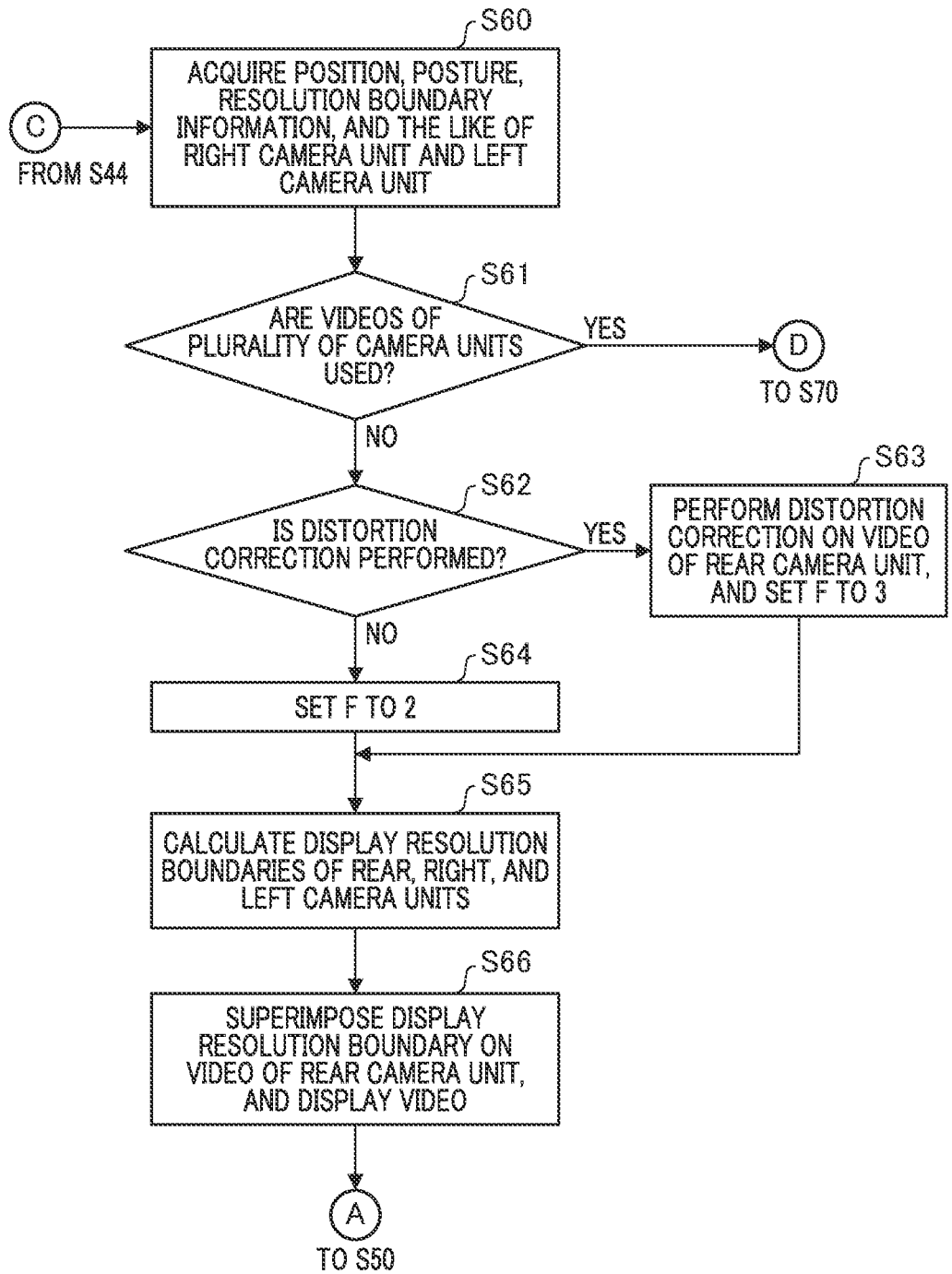
FIG. 6 is a flowchart illustrating branching processing from FIG. 4.

In step S44 of FIG. 4, it is determined whether or not to perform resolution boundary display for the plurality of camera units, and in the case of Yes, the processing proceeds to step S60 (characteristics information acquisition step) of FIG. 6.

FIG. 6 is a flowchart illustrating branching processing from FIG. 4. Here, whether or not the inside of the region of the reference frame 200 can be imaged as a high-resolution region is displayed in an easy-to-understand manner. In a case where such imaging is not possible, there is an attempt to support the adjustment of at least one of the positions or postures in which the camera units 12 to 14 are installed.

In step S60, the positions, postures, resolution boundary information, and the like of the right camera unit 12 and the left camera unit 14 are acquired from the camera information units 32c and 34c. That is, boundary information in the camera units 12 and 14 as a plurality of image acquisition units is acquired.

Next, in step S61, it is determined whether or not to use images obtained from the plurality of camera units. In the case of No, the processing proceeds to step S62 to determine whether or not to perform distortion correction.

In the case of Yes in step S62, distortion correction is performed on a video of the rear camera unit 13 in step S63, the flag F is set to 3, and the processing proceeds to step S65. On the other hand, in the case of No in step S62, the flag F is set to 2 in step S64, and then the processing proceeds to step S65.

In step S65, the display resolution boundaries of the rear camera unit 13, the right camera unit 12, and the left camera unit 14 are calculated.

Then, in step S66 (display signal generation step), a plurality of display resolution boundaries are superimposed on the video of the rear camera unit 13 and displayed on the third display unit 52. That is, a display signal in which a plurality of boundary images are superimposed on one image is generated. The display signal is supplied to and displayed on the third display unit 52 of the tablet terminal used at the time of adjusting the camera unit, for example, via the communication unit 62.

Figure 9C:
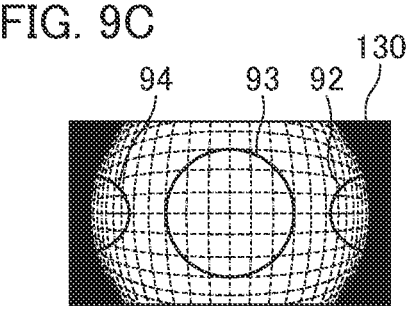
Figure 9D:
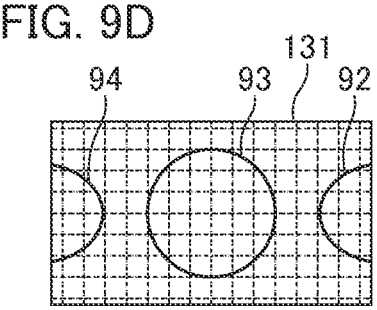

FIG. 9C is a diagram illustrating an example in which the display resolution boundary 93 of the camera unit 13, a display resolution boundary 92 of the camera unit 12, and a display resolution boundary 94 of the camera unit 14 are superimposed on the video 130, having not been subjected to distortion correction, which is obtained from the camera unit 13 and displayed. Both FIGS. 9C and 9D are examples of videos displayed on the display unit of the tablet terminal, which is the third display unit 52. When using an imaging unit including a different-angle-of-view lenses on the front/left/right side, the region inside the resolution boundary 92 is the high-resolution region. However, when using an imaging unit including the reverse-different-angle-of-view lens on the front/left/right side, the region outside the resolution boundary 92 and captured with the reverse different-angle-of-view lens is the high-resolution region.

That is, an image displayed in a case where the flag F is 2 is illustrated. On the other hand, FIG. 9D is a diagram illustrating an example in which the display resolution boundary 93 of the camera unit 13, the display resolution boundary 92 of the camera unit 12, and the display resolution boundary 94 of the camera unit 14 are superimposed on the video 131, having been subjected to distortion correction, which is obtained from the camera unit 13.

That is, an image displayed in a case where the flag F is 3 is illustrated. Note that the display resolution boundaries 92 and 94 displayed in FIG. 9D are subjected to coordinate conversion according to distortion correction. The display resolution boundary 93 may also be subjected to coordinate conversion according to distortion correction.

After step S66, the processing proceeds to step S50. Operations of steps S50 to S54 are the same as those already described, but in a case where the flag F is 2 or 3, a screen for adjustment as illustrated in FIG. 11B is displayed in step S50.

Figure 11B:
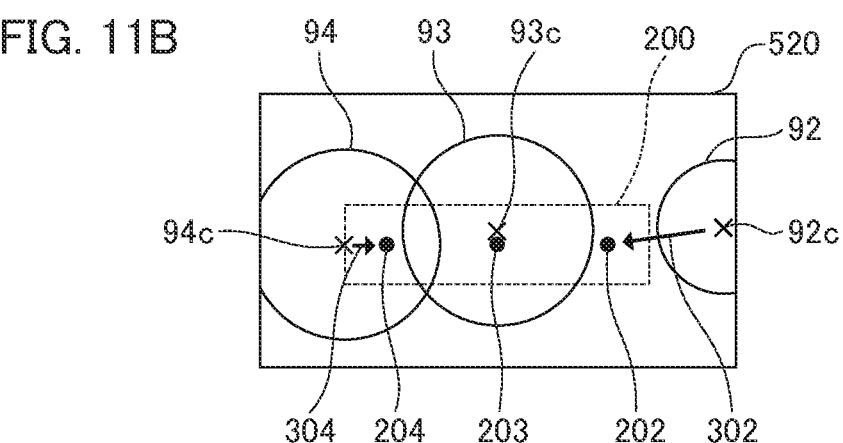
Figure 12:
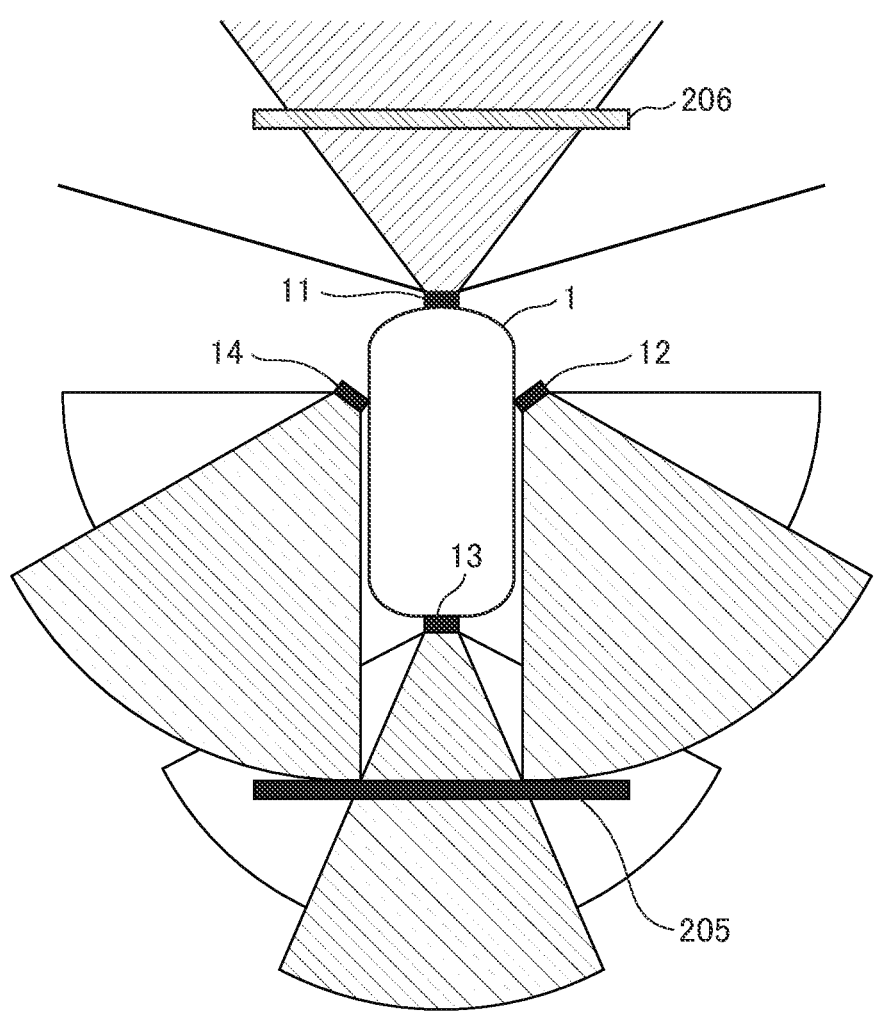
FIG. 12 is a diagram illustrating an example of an installation position of a reference frame.

FIG. 11B is a diagram illustrating examples of a reference frame and the like displayed on a screen for adjustment when the flag F is 2 or 3. Note that the screen in FIG. 11B is a screen before distortion correction is performed when the flag F is 2, and is a screen after distortion correction has been performed when the flag F is 3.

In a case where the flag F is 2 or 3, the reference frame 200, the reference frame center 203, and the reference point 202 for aligning the center of gravity 93c of the display resolution boundary 92 of the right camera unit 12 are displayed. Further, a reference point 204 for aligning a center of gravity 94c of the display resolution boundary 94 of the left camera unit 14 is displayed.

Then, in step S51, it is determined that the reference frame center 203 and the center of gravity 93c of the display resolution boundary 93 match each other, the reference point 202 and the center of gravity 93c of the display resolution boundary 92 match each other, and the reference point 204 and the center of gravity 94c of the display resolution boundary 94 match each other.

Note that, here, the reference points 202 and 204 are set at a predetermined distance from the reference frame center 203, and the display resolution boundaries 92 and 93 are set to overlap each other by a predetermined amount. Further, the display resolution boundaries 94 and 93 are set to overlap each other by a predetermined amount. That is, as described above, in the first embodiment, the imaging ranges (particularly, the high-resolution region (low-distortion region)) of at least two image acquisition units are adjusted and disposed to overlap each other. In addition, as described above, in step S51, the reference points 202 and 204 and the centers of gravity 92c and 93c do not necessarily have to match each other. It is only required that most (ideally, the entirety) in the reference frame region can be adjusted to become a high-resolution region. Consequently, when a threshold value is set and the area of the high-resolution region in the reference frame region exceeds the threshold value, the determination result in S51 can be Yes. When the area is equal to or less than the threshold value, the determination result is No in S51, and the processing proceeds to S52.

Note that the reference frame 200 in FIG. 11B corresponds to an image region displayed on the electronic rear-view mirror, as described above.

Thus, the image processing unit 41a synthesizes and displays the image signals obtained from the camera units 12 to 14, for example, during normal driving of the vehicle 1. In addition, an image region corresponding to the reference frame 200 can be cut out from the synthesized image and displayed on the first display unit 50 as, for example, an electronic rear-view mirror. However, during the adjustment of the camera units 12 to 14, the overall image as illustrated in FIG. 11B is displayed on the third display unit 52 such as a display unit of a tablet terminal, and the postures and the like of the camera units 12 to 14 can be adjusted.

In step S52, when there is a deviation between the reference frame center 203 and the center of gravity 93c of the display resolution boundary 93, the deviation is indicated by the arrow 303. Further, as illustrated in FIG. 11B, a deviation between the reference point 202 and the center of gravity 93c of the display resolution boundary 92 is indicated by an arrow 302, and a deviation between the reference point 204 and the center of gravity 94c of the display resolution boundary 94 is indicated by an arrow 304. Along with the arrow 302, text or a sound such as "Please point the right camera toward the vehicle" can be displayed or notified of.

In addition, as described above, it is not always necessary to adjust the deviation until the reference points 202 and 204 and the centers of gravity 92c and 93c match each other. It is only required that most (ideally, the entirety) in the reference frame region can be adjusted to become a high-resolution region. Consequently, when a threshold value is set and the area of the high-resolution region in the reference frame region exceeds the threshold value, the determination result in S53 is Yes, and the processing proceeds to S54.

In step S53, the user adjusts the positions and postures of the camera units 12 to 14, and in a case where the user clicks the adjustment completion button after the adjustment has been completed, it is determined that the adjustment has been completed.

Figure 7:
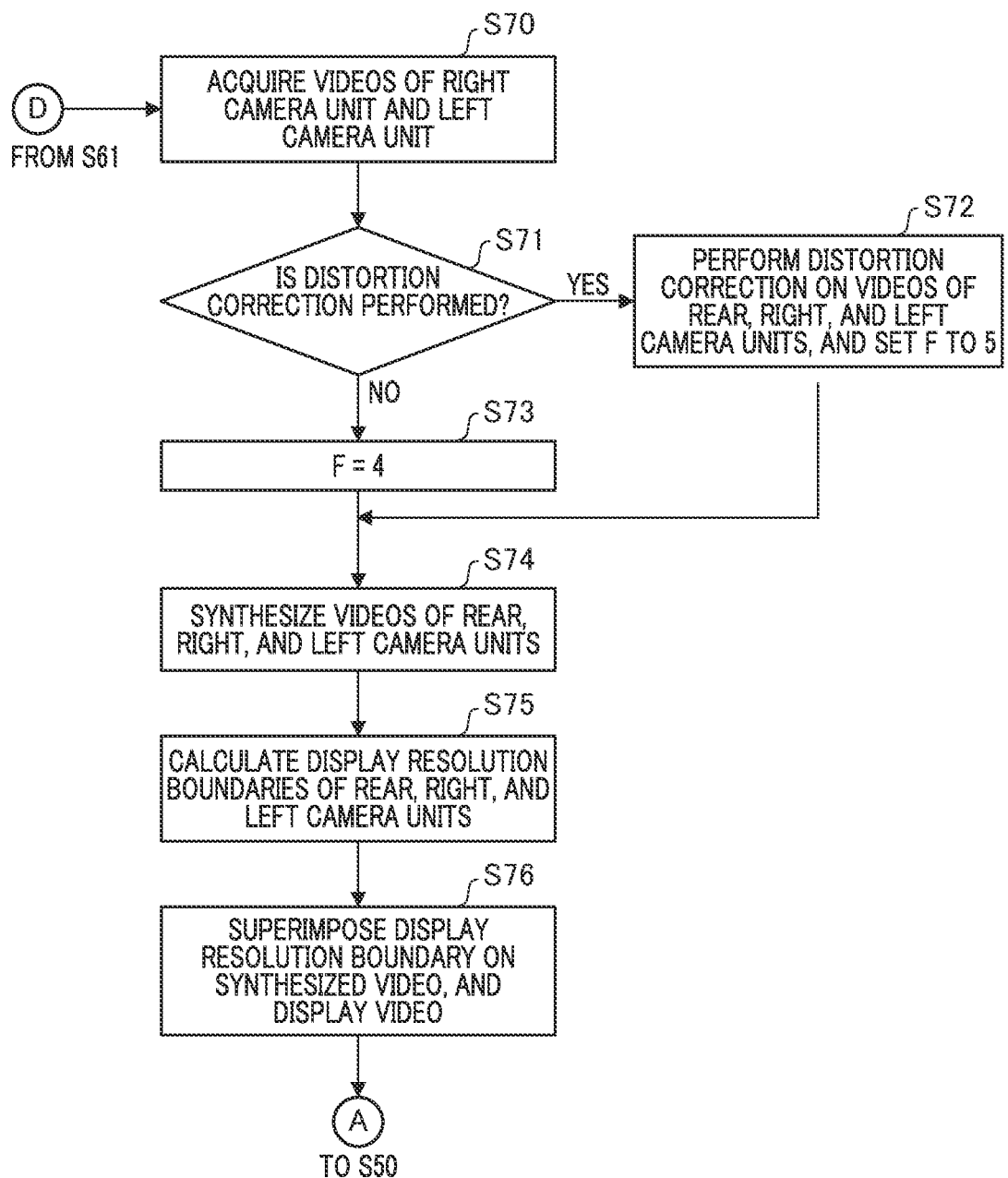
FIG. 7 is a flowchart illustrating the branching processing from FIG. 6.

Next, when it is determined in step S61 of FIG. 6 whether or not to use videos of the plurality of cameras, and in the case of Yes, the processing proceeds to step S70 of FIG. 7.

FIG. 7 is a flowchart illustrating branching processing from FIG. 6.

In step S703 (image acquisition step), videos of the right camera unit 12 and the left camera unit 14 are acquired, and it is determined in step S71 whether or not to perform distortion correction.

In the case of Yes in step S71, distortion correction is performed on the videos of the rear camera unit 13, the right camera unit 12, and the left camera unit 14 in step S72, the flag F is set to 5, and the processing proceeds to step S74. On the other hand, in the case of No in step S71, the flag F is set to 4 in step S73, and then the processing proceeds to step S74.

In step S74, the videos of the rear camera unit 13, the right side camera unit 12, and the left side camera unit 14 are synthesized. That is, image signals acquired from the plurality of image acquisition units are synthesized to generate a synthesized image.

Next, in step S75, display resolution boundaries of the rear camera unit 13, the right side camera unit 12, and the left side camera unit 14 are calculated.

Then, in step S76 (display signal generation step), the display resolution boundaries are superimposed on the synthesized image and displayed on the third display unit 52. That is, a display signal in which a plurality of boundary images are superimposed on the synthesized image is generated. The display signal is supplied to and displayed on the third display unit 52 of the tablet terminal used at the time of adjusting the camera unit, for example, via the communication unit 62.

Figure 9E:
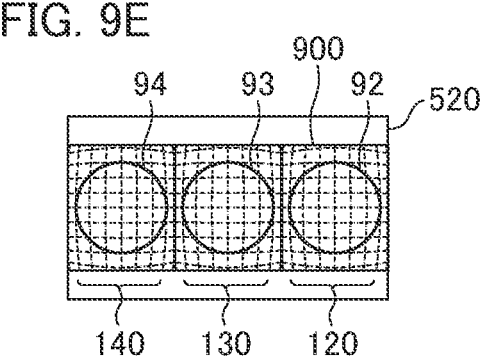

FIG. 9E is a diagram illustrating an example in which display resolution boundaries are superimposed on an image synthesized without performing distortion correction, and illustrates a video displayed in a case where the flag F is 4.

Figure 9F:
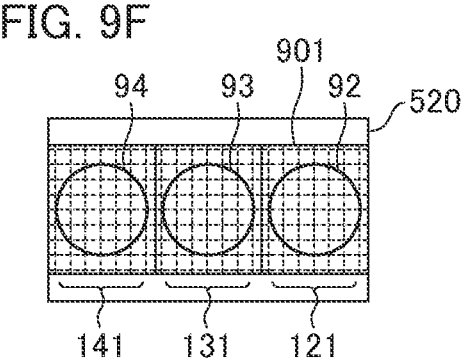

FIG. 9F is a diagram illustrating an example in which display resolution boundaries are superimposed on an image synthesized after distortion correction is performed, and illustrates an image displayed in a case where the flag F is 5. Reference numeral 520 denotes a screen frame of the third display unit 52.

Reference numeral 120 denotes an image signal, having not been subjected to distortion correction, which is obtained from the right camera unit 12, reference numeral 130 denotes an image signal, having not been subjected to distortion correction, which is obtained from the rear camera unit 13, and reference numeral 140 denotes an image signal, having not been subjected to distortion correction, which is obtained from the left camera unit 14. Reference numeral 900 denotes an image in which the image signals are displayed side by side. Camera videos are arranged such that resolution boundaries are separated by the distances of the display resolution boundaries of the cameras. For example, when the installation positions or postures of the camera units are changed in accordance with the guides illustrated in FIGS. 11B and 11C, and the display resolution boundaries approach each other, information (circle line) indicating a boundary also approaches.

Further, reference numeral 121 denotes an image signal, having been subjected to distortion correction, which is obtained from the right camera unit 12, reference numeral 131 denotes an image signal, having been subjected to distortion correction, which is obtained from the rear camera unit 13, and reference numeral 141 denotes an image signal, having been subjected to distortion correction, which is obtained from the left camera unit 14. Reference numeral 901 denotes an image in which the image signals are displayed side by side. Camera videos are arranged such that resolution boundaries are separated by the distances of the display resolution boundaries of the cameras.

Figure 11C:
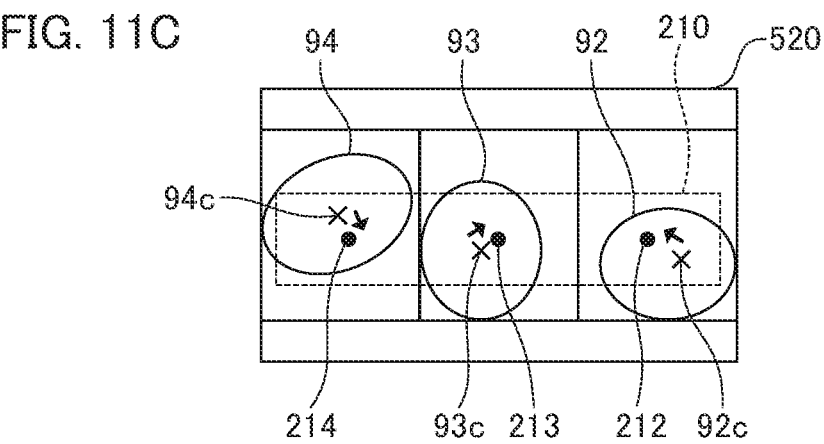

For example, when the installation positions or postures of the camera units are changed in accordance with the guides illustrated in FIGS. 11B and 11C, and the display resolution boundaries approach each other, information (circle line) indicating a boundary also approaches.

Note that the display resolution boundaries 92 and 94 displayed in FIG. 9F are subjected to coordinate conversion according to distortion correction. The display resolution boundary 93 may also be subjected to coordinate conversion according to distortion correction.

Note that, in the first embodiment, the display resolution boundaries 92 and 94 are displayed on the screen 520 of the third display unit 52 so as not to overlap the display resolution boundaries 93 in FIG. 9E and FIG. 9F. However, an image displayed on an electronic room monitor during normal driving or the like is synthesized in a state where a portion of the display resolution boundary 92 and the display resolution boundary 93 overlap each other. Further, a portion of the display resolution boundary 94 and the display resolution boundary 93 are synthesized in an overlapping state.

After step S76, the processing proceeds to step S50. Operations of steps S50 to S54 are the same as those already described, but in a case where the flag F is 4 or 5, a screen for adjustment as illustrated in FIG. 11C is displayed in step S50.

FIG. 11C is a diagram illustrating an example of a screen for adjustment when the flag F is 4 or 5, and the screen is a screen before distortion correction is performed when the flag F is 4, and is a screen after distortion correction has been performed when the flag F is 5.

In FIG. 11C, in the reference frame 210, a reference point 212 for aligning the center of gravity 93c of the display resolution boundary 92 of the right camera unit 12 is displayed, in addition to the reference frame center 213. Further, a reference point 214 for aligning the center of gravity 94c of the display resolution boundary 94 of the left camera unit 14 is displayed.

Then, in step S51, it is determined that the reference frame center 213 and the center of gravity 93c of the display resolution boundary 93 match each other, the reference point 212 and the center of gravity 93c of the display resolution boundary 92 match each other, and the reference point 214 and the center of gravity 94c of the display resolution boundary 94 match each other.

Note that, the reference frame 210 in FIG. 11C corresponds to an image region displayed on the electronic rear-view mirror. However, in FIG. 11C, the images of the camera units 11 to 13 are displayed side by side without being synthesized, but a synthesized image obtained by partially superimposing the images of the camera units 11 to 13 on each other is actually displayed on the electronic rear-view mirror. Thus, the reference frame 210 is displayed at the time of adjustment, and has a longer and narrower shape than the reference frame 200 actually corresponding to the electronic rear-view mirror illustrated in FIGS. 11A and 11B.

That is, in a case where the image processing unit 41a synthesizes and displays the image signals obtained from the camera units 12 to 14, an image region corresponding to the reference frame 200 of FIG. 11A is cut out from a synthesized image and displayed on, for example, the first display unit 50 as an electronic rear-view mirror.

Note that, in the first embodiment, the cut-out region of the synthesized image displayed on the electronic rear-view mirror corresponds to the high-resolution regions (low-resolution regions) of the camera units 12 to 14, and only the high-resolution regions (low-resolution regions) in the synthesized image are cut out and displayed.

However, as described above, during the adjustment of the camera units 12 to 14, the overall image and the reference frame 210 as illustrated in FIG. 11C are displayed on the third display unit 52 such as a display unit of a tablet terminal, and the positions and postures of the camera units 12 to 14 can be adjusted.

In step S52, when there is a deviation between the reference frame center 213 and the center of gravity 93c of the display resolution boundary 93, the deviation is indicated by an arrow. Further, a deviation between the reference point 212 and the center of gravity 93c of the display resolution boundary 92 is indicated by an arrow, and a deviation between the reference point 214 and the center of gravity 94c of the display resolution boundary 94 is indicated by an arrow. Further, since the other operations of steps S50 to S54 are the same as those already described, the description thereof will be omitted. That is, in a state where a plurality of boundary images is displayed on the synthesized image, guide information such as an arrow for adjusting the posture of the imaging unit is generated.

Next, in step S41 of FIG. 4, it is determined whether or not the rear camera unit has been adjusted. In the case of No, the processing proceeds to step S80 (characteristics information acquisition step) of FIG. 8.

Figure 8:
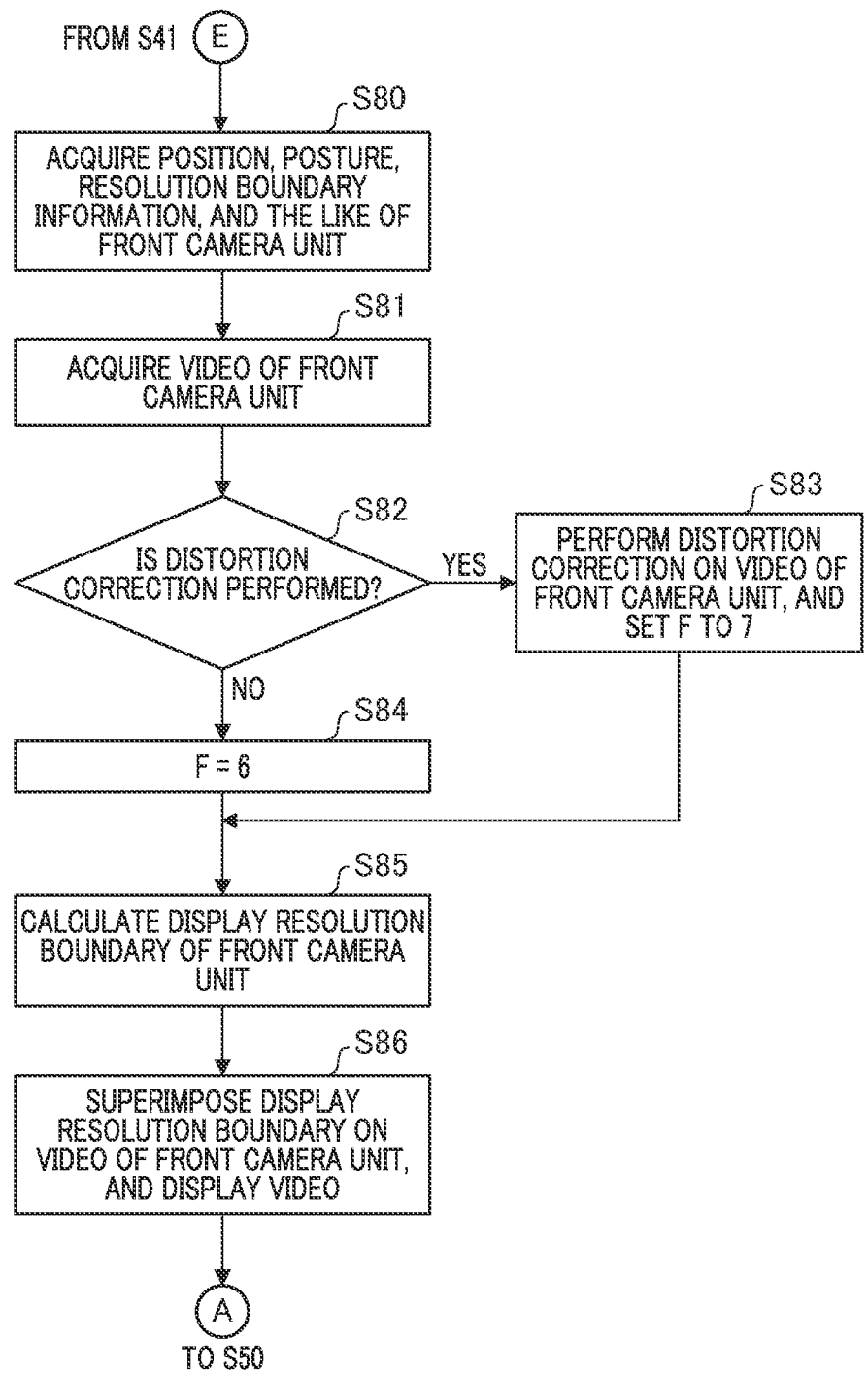
FIG. 8 is a flowchart illustrating another branching processing from FIG. 4.

FIG. 8 is a flowchart illustrating another branching processing from FIG. 4.

In step S80, the position, posture, resolution boundary information, and the like of the front camera unit 11 are acquired from the camera information unit 31c of the front camera unit 11, and a video of the front camera unit 11 is acquired in step S813 (image acquisition step).

Then, it is determined in step S82 whether or not to perform distortion correction. In the case of Yes, distortion correction is performed on the video of the front camera unit 11 in step S83, the flag F is set to 7, and the processing proceeds to step S85. On the other hand, in the case of No in step S82, the flag F is set to 6 in step S84, and then the processing proceeds to step S85.

In step S85, the display resolution boundary of the front camera unit 11 is calculated, and the display resolution boundary is superimposed on the video of the front camera unit 11 and displayed on the third display unit 52 in step S86 (display signal generation step). That is, for example, the video is displayed on the third display unit 52 of the tablet terminal used at the time of adjusting the camera unit via the communication unit 62.

Figure 9G:
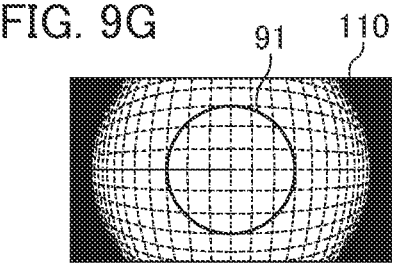
Figure 9H:
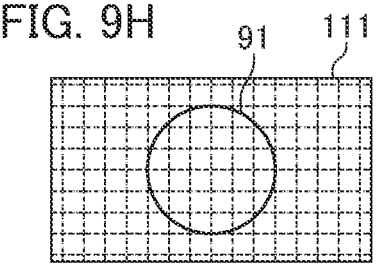

FIG. 9G is a diagram illustrating an example in which the display resolution boundary 91 of the front camera unit 11 is superimposed on a video 110 of the front camera unit 11 which has not been subjected to distortion correction, and illustrates an example of an image displayed in a case where the flag F is 6. FIG. 9H is a diagram illustrating an example in which the display resolution boundary 91 of the front camera unit 11 is superimposed on a video 111 of the front camera unit 11 after distortion correction is performed, and illustrates an image displayed in a case where the flag F is 7 as an example.

Note that the display resolution boundary 91 displayed in FIG. 9H may be subjected to coordinate conversion according to distortion correction.

After step S86, the processing proceeds to step S50. Operations of steps S50 to S54 are the same as those already described, but in a case where the flag F is 6 or 7, a screen for adjustment as illustrated in FIG. 11A is displayed in step S50. Note that the screen of FIG. 11A is a screen before distortion correction is performed when the flag F is 6, and is a screen after distortion correction has been performed when the flag F is 7. Note that the display resolution boundary 93 and the center of gravity 93c thereof in FIG. 11A are read as the display resolution boundary 91 and a center 91c thereof, respectively.

Further, a virtual reference frame for the front camera unit 11 may have the same size as the reference frame 200, and may be displayed on the screen as if it is virtually disposed at a position denoted by reference numeral 206 in front of the vehicle 1, the position being on a side opposite to the position 205 behind the vehicle 1 in FIG. 12.

Note that the reference frame 200 in FIG. 11A corresponds to an image region displayed on the electronic rear-view mirror, as described above.

Thus, in a case where the image processing unit 41a displays an image signal obtained from the camera unit 11, the image region corresponding to the reference frame 200 can be cut out and displayed on, for example, the first display unit 50 as an electronic rear-view mirror. However, during the adjustment of the camera unit 11, the overall image as illustrated in FIG. 11A is displayed on a screen 520 of the third display unit 52 such as a display unit of a tablet terminal, and the position and posture of the camera unit 11 can be adjusted.

In this manner, in the first embodiment, the high-resolution region (low-distortion region) 10a is configured to have a projection characteristic close to a central projection method ($y = f \times \tan \theta$) and an equidistant projection method ($y = f \times \theta$) of a normal optical system for imaging, as described above. Thus, for example, the image for the electronic rear-view mirror displayed on the first display unit 50 has a higher resolution than the low-resolution region (high-distortion region) 10*b*, and can display long distances of the front, side, and rear of the vehicle 1 more finely.

Further, since the high-resolution region 10*a* has a small optical distortion, the image for the electronic rear-view mirror displayed on the first display unit 50 can also be displayed in a state where a distortion is small, and a driver can visually recognize the surroundings of the vehicle with a more natural depth perception.

In the adjustment example of FIG. 11, the case where the imaging unit including the different-angle-of-view lens on the right side is used has been described. However, when using an imaging unit that includes an inverse different-angle-of-view lens on the right side, adjustments are made so that the high-resolution regions outside the resolution boundaries 92 and 94 fall within the reference frame 200.

Further, the high-resolution region 10*a* in the first embodiment is configured such that an optical distortion becomes small, and image recognition can be performed in the state of a RAW image signal for which distortion correction has not been performed, which makes it possible to reduce a processing load for the image recognition and perform the image recognition at high speed. Thus, obstacles can be detected at an early stage based on image recognition results, and an operation for avoiding the obstacles can be performed in a timely manner. In this manner, when the configuration of the first embodiment is used, a great effect can be obtained especially at the time of high-speed traveling on a highway or the like.

Note that, although an example in which a plurality of camera units are used has been described in the above embodiment, it is also effective in a system having only one camera unit. In addition, according to the first embodiment, in a system using a different-angle-of-view lens as described above, the positions and postures of camera units to be installed can be easily adjusted, and thus it is possible to drastically improve work efficiency for adjustment and sufficiently draw out the performance of the system using the different-angle-of-view lens.

Note that, in the above embodiment, although an adjustment process can be shortened by displaying boundary images of a low-distortion region and a high-distortion region at the time of adjusting the camera units, the boundary images may be displayed, for example, during normal driving even when adjustment is not performed.

Note that an example in which an image processing system is mounted on a mobile object such as a vehicle has been described in the above-described embodiment. However, the mobile object in the first embodiment is not limited to a vehicle such as an automobile, and may be any moving device such as a train, a ship, an airplane, a robot, or a drone. In addition, the image processing system in the first embodiment includes those mounted on the moving bodies.

In addition, the first embodiment can also be applied when a mobile object is controlled remotely.

Second Embodiment

At least one of the various functions, processing, and methods described in the first embodiment described above can be realized using programs. Hereinafter, in a second embodiment, a program for realizing at least one of the various functions, processing, and methods described in the first embodiment described above is referred to as a "program X". Further, in the second embodiment, a computer for executing the program X is referred to as a "computer Y".

A personal computer, a microcomputer, a central processing unit (CPU), and the like are examples of the computer Y A computer such as the image processing system in the above-described embodiment is also an example of the computer Y.

At least one of the various functions, processing, and methods described in the first embodiment described above can be realized by causing the computer Y to execute the program X. In this case, the program X is supplied to the computer Y via a computer-readable storage medium. The computer-readable storage medium in the second embodiment includes at least one of a hard disk device, a magnetic storage device, an optical storage device, a magneto-optical storage device, a memory card, a ROM, a RAM, and the like. Further, the computer-readable storage medium in the second embodiment is a non-transitory storage medium.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the image processing system through a network or various storage media. Then, a computer (or a CPU, an MPU, or the like) of the image processing system may be configured to read and execute the program. In such a case, the program and the storage medium storing the program configure the present invention.

This application claims the benefit of Japanese Patent Application No. 2021-155589 filed on Sep. 24, 2021, and Japanese Patent Application No. 2022-148737 filed on Sep. 20, 2022, both of which are hereby incorporated by reference herein in their entirety.

What is claimed is:

1. An image processing system comprising:
   at least one processor or circuit configured to function as a plurality of units comprising:
   (1) an image acquisition unit configured to acquire a plurality of image signals respectively formed by a plurality of imaging units disposed at different positions, wherein each of the plurality of imaging units captures an optical image having a low-distortion region and a high-distortion region;
   (2) a characteristics information acquisition unit configured to acquire characteristics information regarding characteristics of the optical image of each of the plurality of imaging units; and
   (3) a display signal generation unit configured to (a) generate a synthesis image by synthesizing the plurality of image signals acquired from the plurality of imaging units and (b) generate a display signal for superimposing, on the synthesis image, information indicating a boundary between the low-distortion region and the high-distortion region based on the characteristics information.

2. The image processing system according to claim 1, wherein each of the plurality of imaging units includes (1) an optical system that forms the optical image and (2) an imaging element that captures the optical image formed by the optical system.

3. The image processing system according to claim 1, wherein the display signal generation unit generates a display signal in which information indicating a plurality of the boundaries is superimposed on one image based on the characteristics information.

4. The image processing system according to claim 3, wherein the display signal generation unit generates a display signal for superimposing the information indicating the plurality of boundaries on the synthesis image.

5. The image processing system according to claim 1, wherein the display signal generation unit generates a display signal including guide information for adjusting a posture of an imaging unit of the plurality of imaging units.

6. The image processing system according to claim 5, wherein the guide information includes a reference frame, and
wherein the reference frame corresponds to an image region displayed on an electronic rear-view mirror.

7. The image processing system according to claim 1, wherein the low-distortion region and the high-distortion region correspond to a high-resolution region and a low-resolution region of the optical image, respectively.

8. The image processing system according to claim 2, wherein when a focal length of the optical system is f, a half angle of view is θ, an image height on an image plane is y, and a projection characteristic representing a relationship between the image height y and the half angle of view θ is y(θ), y(θ) in the low-distortion region is larger than f×θ, and is different from the projection characteristic in the high-distortion region.

9. The image processing system according to claim 8, wherein the low-distortion region has a projection characteristic close to a central projection method or an equidistant projection method.

10. The image processing system according to claim 8, wherein when θmax is a maximum half angle of view of the optical system and A is a predetermined constant, the image processing system is configured to satisfy the following condition.

$$1 < \frac{f \times \sin\theta_{max}}{y(\theta_{max})} \leq A.$$

11. The image processing system according to claim 1, wherein the characteristics information includes resolution boundary information of the optical image.

12. An image processing system comprising:
at least one processor or circuit configured to function as a plurality of units comprising:
(1) a plurality of image acquisition units configured to acquire a respective plurality of image signals respectively formed by a plurality of imaging units disposed at different positions, wherein each of the plurality of imaging units captures an optical image having a low-distortion region and a high-distortion region;
(2) a characteristics information acquisition unit configured to acquire characteristics information regarding characteristics of the optical image of each of the image acquisition plurality of imaging units; and
(3) a display signal generation unit configured to generate a predetermined display signal by performing image processing on the plurality of image signals based on the characteristics information acquired by the characteristics information acquisition unit,
wherein the predetermined display signal includes an indication of a boundary between the low-distortion region and the high-distortion region based on the characteristics information, and
wherein imaging ranges of at least two imaging units among the plurality of imaging units are disposed to overlap each other.

13. The image processing system according to claim 12, wherein each of the plurality of imaging units includes (a) an optical system that forms the optical image and (b) an imaging element that captures the optical image formed by the optical system.

14. The image processing system according to claim 13, wherein when a focal length of the optical system is f, a half angle of view is θ, an image height on an image plane is y, and a projection characteristic representing a relationship between the image height y and the half angle of view θ is y(θ), y(θ) in the low-distortion region is larger than f×θ, and is different from the projection characteristic in the high-distortion region.

15. The image processing system according to claim 14, wherein the low-distortion region has a projection characteristic close to a central projection method or an equidistant projection method.

16. The image processing system according to claim 14, wherein when θmax is a maximum half angle of view of the optical system and A is a predetermined constant, the image processing system is configured to satisfy the following condition.

$$1 < \frac{f \times \sin\theta_{max}}{y(\theta_{max})} \leq A.$$

17. The image processing system according to claim 12, wherein imaging ranges of the low-distortion regions of at least imaging units of the plurality of imaging units are disposed to overlap each other.

18. The image processing system according to claim 12, wherein the display signal generation unit synthesizes the image signals from at least two image acquisition units to generate a synthesis image.

19. The image processing system according to claim 13, wherein the display signal generation unit generates a display signal for superimposing information indicating the boundary on an image acquired from an imaging unit of the plurality of imaging units.

20. The image processing system according to claim 13, wherein the display signal generation unit generates a display signal including guide information for adjusting posture of an imaging unit of the plurality of imaging units.

21. The image processing system according to claim 20, wherein the guide information includes a reference frame, and
wherein the reference frame corresponds to an image region displayed on an electronic rear-view mirror.

22. The image processing system according to claim 13, wherein the low-distortion region and the high-distortion region correspond to a high-resolution region and a low-resolution region of the optical image, respectively.

23. An image processing method comprising:
acquiring a plurality of image signals respectively formed by a plurality of imaging devices disposed at different positions, wherein each of the plurality of imaging devices captures an optical image having a low-distortion region and a high-distortion region;
acquiring characteristics information regarding characteristics of the optical image of each of the plurality of imaging devices; and forming information indicating a boundary between the low-distortion region and the high-distortion region based on the characteristics information acquired in the acquiring of the characteristics information, and generating a display signal for superimposing the information indicating the boundary on an image generated in accordance with the plurality of image signals.

24. A non-transitory computer-readable storage medium configured to store a computer program comprising instructions to control an image processing system for executing a method comprising:

acquiring a plurality of image signals respectively formed by a plurality of imaging devices disposed at different positions, wherein each of the plurality of imaging devices captures an optical image having a low-distortion region and a high-distortion region;

acquiring characteristics information regarding characteristics of the optical image of each of the plurality of imaging devices; and forming information indicating a boundary between the low-distortion region and the high-distortion region based on the characteristics information acquired in the acquiring of the characteristics information, and generating a display signal for superimposing the information indicating the boundary on an image generated in accordance with the plurality of image signals.

25. An image pickup apparatus comprising:
at least one processor or circuit configured to function as an image acquisition unit configured to acquire an image signal formed by an imaging unit that captures an optical image having a low-distortion region and a high-distortion region;

wherein the image acquisition unit includes an optical system, and wherein when a focal length of the optical system is f, a half angle of view is θ, an image height on an image plane is y, and a projection characteristic representing a relationship between the image height y and the half angle of view θ is y(θ), and θmax is a maximum half angle of view of the optical system, the optical system is configured to satisfy the following condition:

$$0.2 < 2*f*\tan(\theta max/2)/y*(\theta max) < 0.92.$$

26. An optical unit comprising:
an optical system unit forming an optical image having a low-distortion region and a high-distortion region on an image plane, wherein when a focal length of the optical system is f, a half angle of view is θ, an image height on an image plane is y, and a projection characteristic representing a relationship between the image height y and the half angle of view θ is y(θ), and θmax is a maximum half angle of view of the optical system, the optical system is configured to satisfy the following condition:

$$0.2 < 2*f*\tan(\theta max/2)/y*(\theta max) < 0.92.$$

* * * * *